United States Patent
Fukai et al.

3,907,405
Sept. 23, 1975

[54] LIQUID CRYSTAL DISPLAY SYSTEM

[75] Inventors: Masakazu Fukai, Nishinomiya; Seiichi Nagata, Sakai; Komei Asai, Hirakata; Katsuji Hattori, Uji, all of Japan

[73] Assignee: Matsushita Electric Industrial Co., Ltd., Kadoma, Japan

[22] Filed: May 29, 1973

[21] Appl. No.: 364,535

[30] Foreign Application Priority Data
May 30, 1972 Japan.............................. 47-53965
May 30, 1972 Japan.............................. 47-53966
May 30, 1972 Japan.............................. 47-53967
June 16, 1972 Japan.............................. 47-60807

[52] U.S. Cl. ........................................ 350/160 LC
[51] Int. Cl.² ............................................ G02F 1/13

[58] Field of Search ........................... 350/160 LC

[56] References Cited
UNITED STATES PATENTS
3,705,310  12/1972  Wild........................ 350/160 LC X Primary Examiner—Edward S. Bauer
Assistant Examiner—Matthew W. Koren
Attorney, Agent, or Firm—Stevens, Davis, Miller & Mosher

[57] ABSTRACT

A liquid crystal display system comprising a liquid crystal display board, in which the temperature of the liquid crystal or the neighborhood thereof is detected, whereby the liquid crystal is driven with an operating output controlled according to the detected temperature information.

16 Claims, 49 Drawing Figures

LIQUID CRYSTAL DISPLAY SYSTEM

This invention relates to liquid crystal display systems utilizing nematic liquid crystals.

One object of the invention is to provide a liquid crystal display system, in which the temperature of or in the neighborhood of a liquid crystal display board is detected so as to apply across the liquid crystal display board a voltage at a frequency corresponding to the detected temperature, that is, an operating frequency suited to the operating temperature, whereby the service life of the system can be greatly extended.

Another object of the invention is to provide a liquid crystal display system, in which the resistance (or resistivity) of the liquid crystal is directly detected so as to apply across the display board a voltage at a frequency corresponding to the magnitude of the detected resistance, that is, an operating frequency suited to the resistance changing with ambient temperature, whereby the service life of the system can be greatly extended.

A further object of the invention is to provide a liquid crystal display system, which is constructed by taking the rise time versus temperature characteristic of the liquid crystal into considerations, and in which the operating voltage applied across the liquid is controlled according to the temperature thereof to provide compensation with respect to the afore-said characteristic so as to prevent the rise time from being greatly changed with the operating temperature, thereby reducing power comsumption of the liquid crystal and liquid crystal drive section and extending the service life of the liquid crystal.

According to the invention there is provided a liquid crystal display system using a nematic liquid crystal comprising a liquid crystal display unit and a temperature detector provided within or in the neighborhood of said display unit, said liquid crystal being driven with an operating output controlled according to temperature information detected by said temperature detector.

A feature of the invention is that a voltage at a frequency corresponding to the detected temperature of the liquid crystal display board or the neighborhood thereof is applied across the liquid crystal display board. Thus, since a frequency suited to the operating temperature can be used as the operating frequency, the service life of the system can be greatly extended.

Another feature of the invention is that a voltage at a frequency corresponding to the magnitude of the resistance of the liquid crystal itself used in the liquid crystal display board is applied thereacross. Thus, since a frequency suited to the resistance that will change with ambient temperature or in use of the liquid crystal can be used as the operating frequency, the service life of the system can be greatly extended.

Further, the invention considers the rise time versus temperature characteristic of the liquid crystal from the standpoint of practicality and features that the operating voltage applied across the liquid crystal is controlled according to the temperature thereof to provide compensation with respect to the afore-mentioned characteristic. Thus, it is possible to reduce power consumption of the liquid crystal and liquid crystal drive section and extend the service life of the liquid crystal.

The above and other objects, features and advantages of the invention will be more fully understood from the following detailed description when the same is taken in conjunction with the accompanying drawings, in which:

FIGS. 1a and 1b show a typical liquid crystal display board, FIG. 1a being an elevational view of the same and FIG. 1b being a section taken along line 1b — 1b in FIG. 1a;

Figure 19:
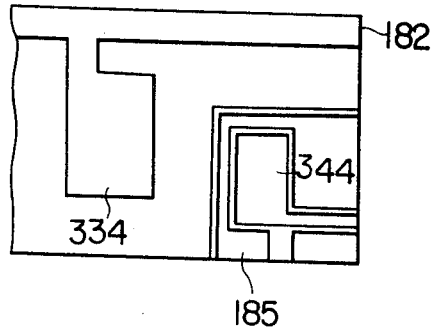
Figure 20:
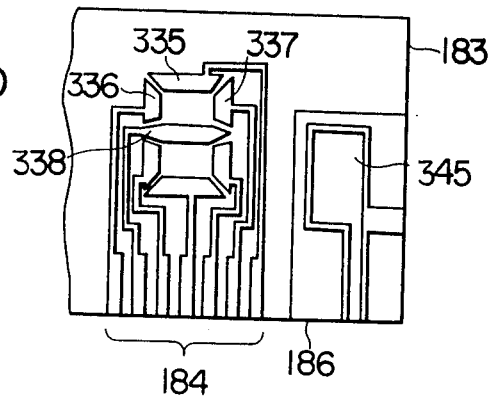
Figure 21:
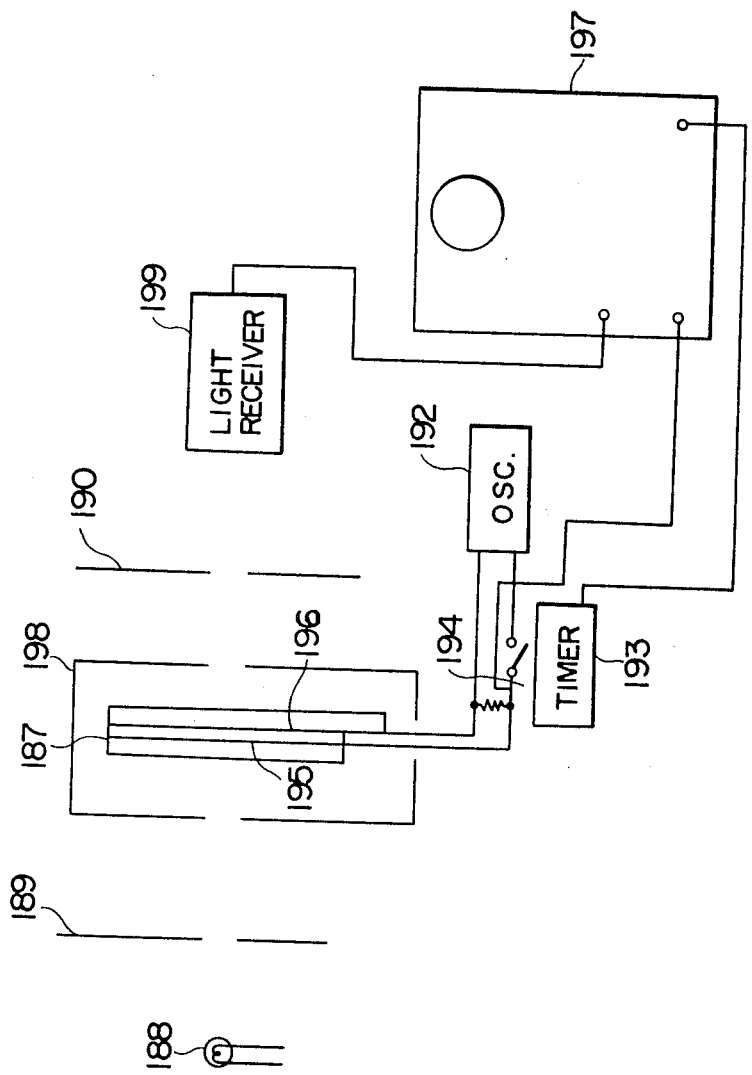
Figure 22:
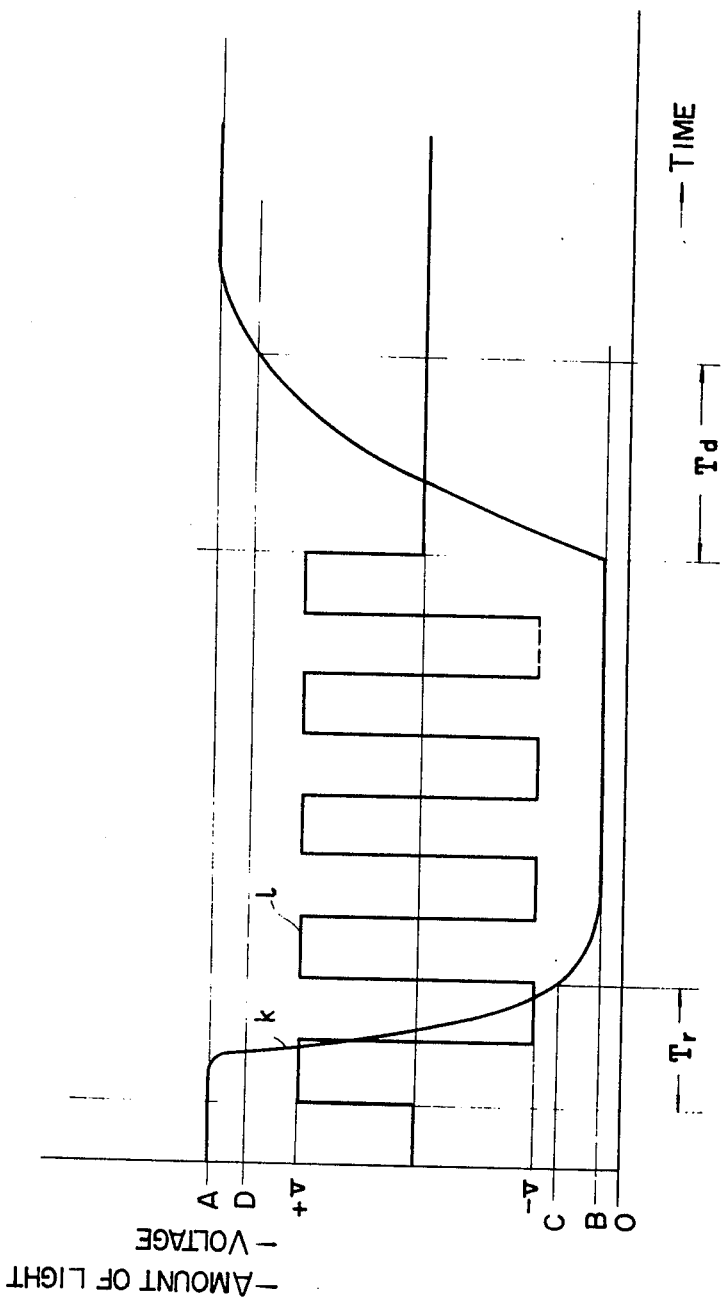
Figure 23:
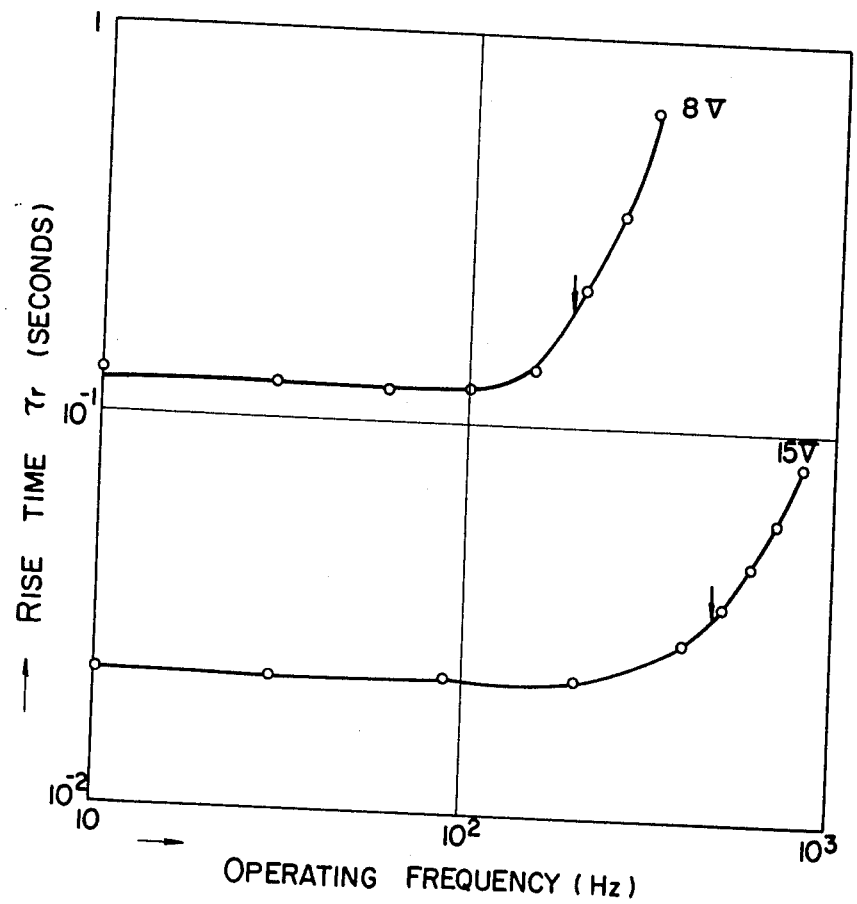
Figure 24:
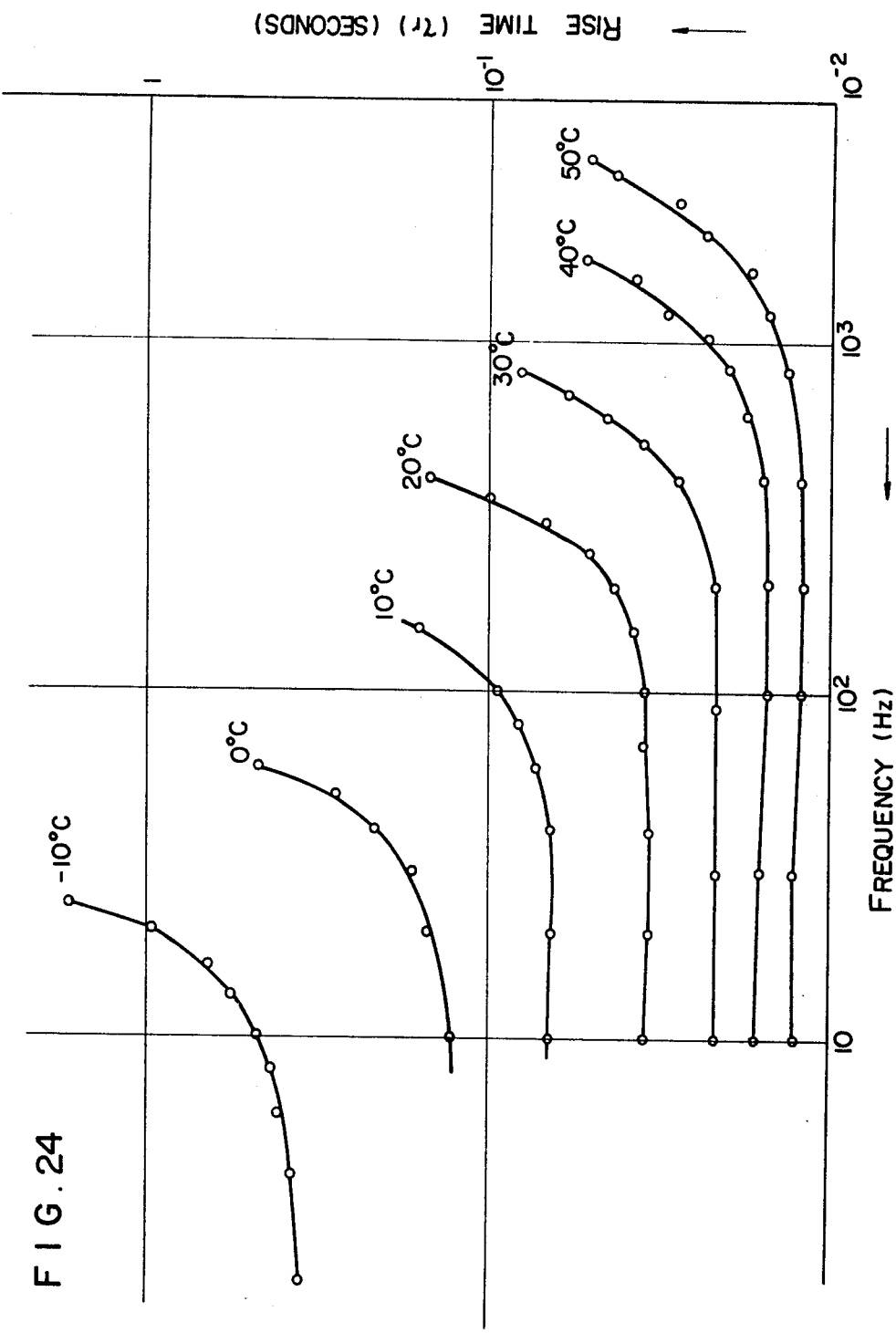
Figure 25:
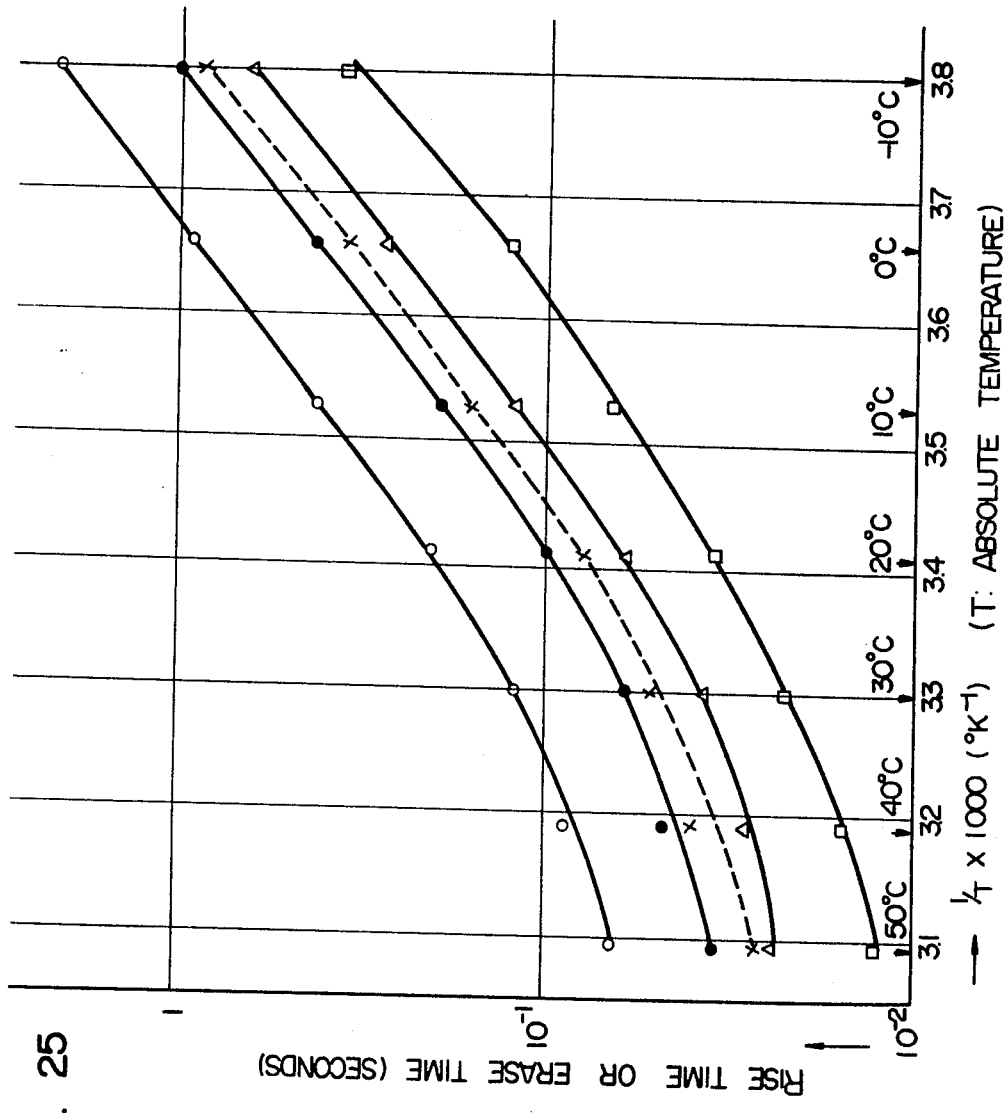
Figure 26:
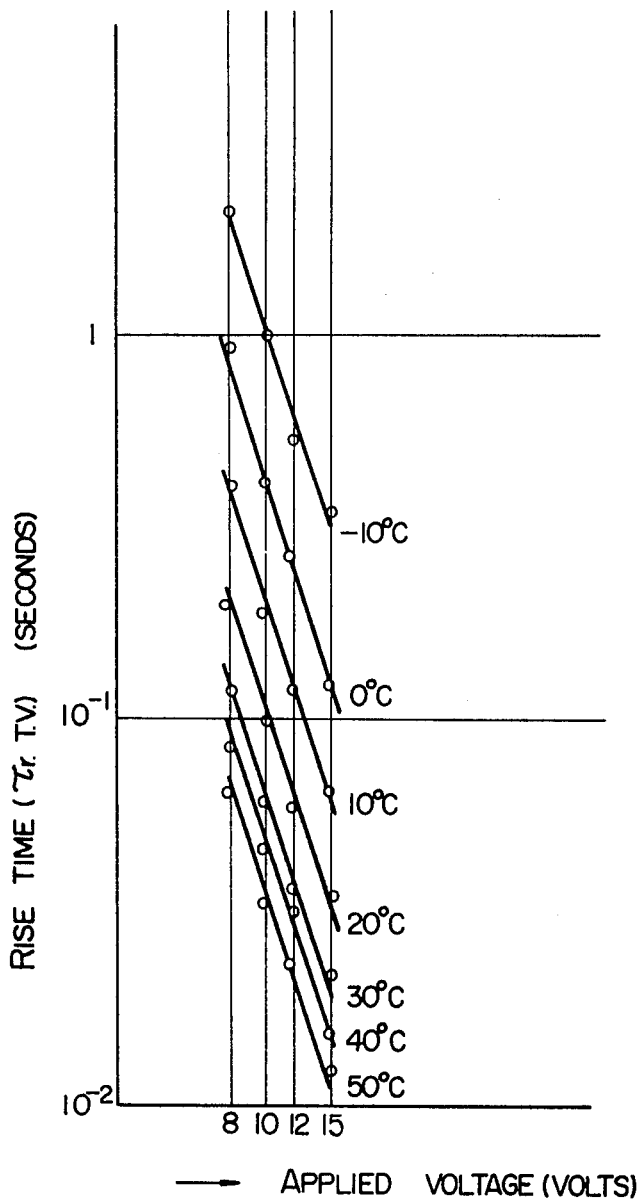
Figure 27:
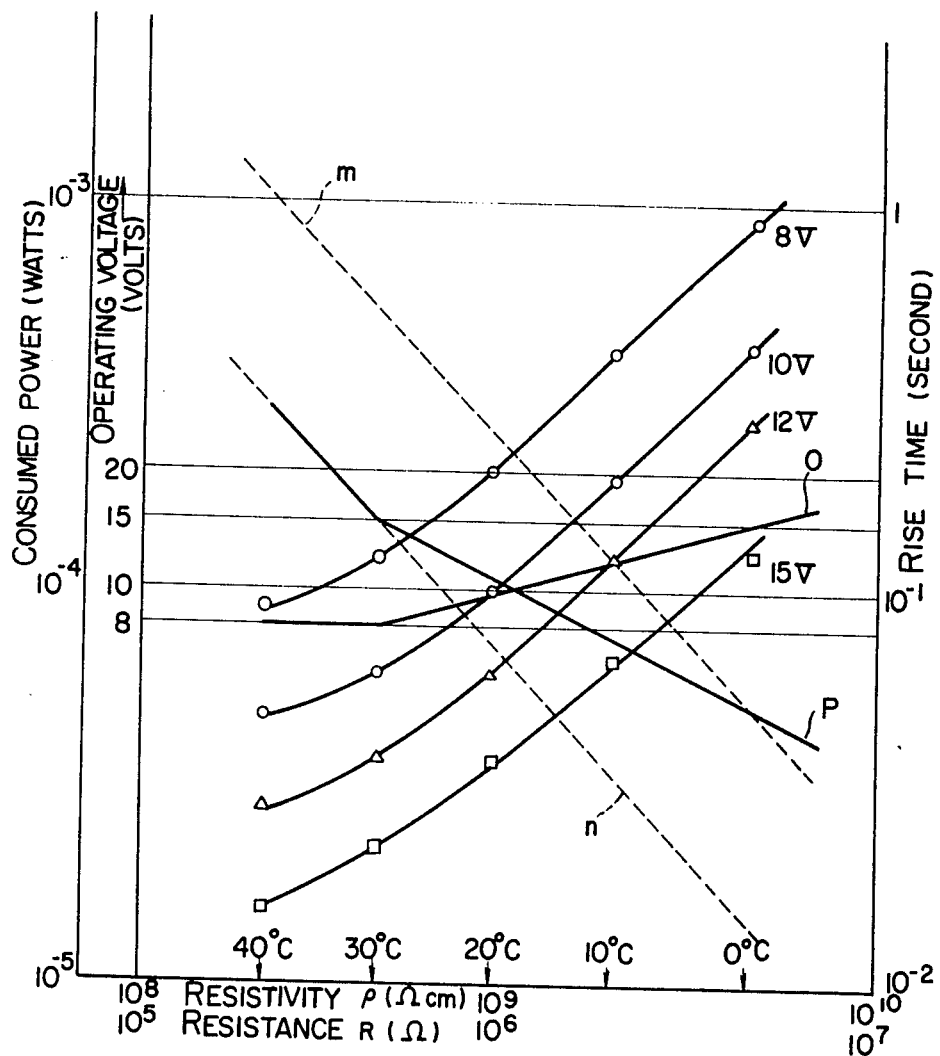
Figure 28:
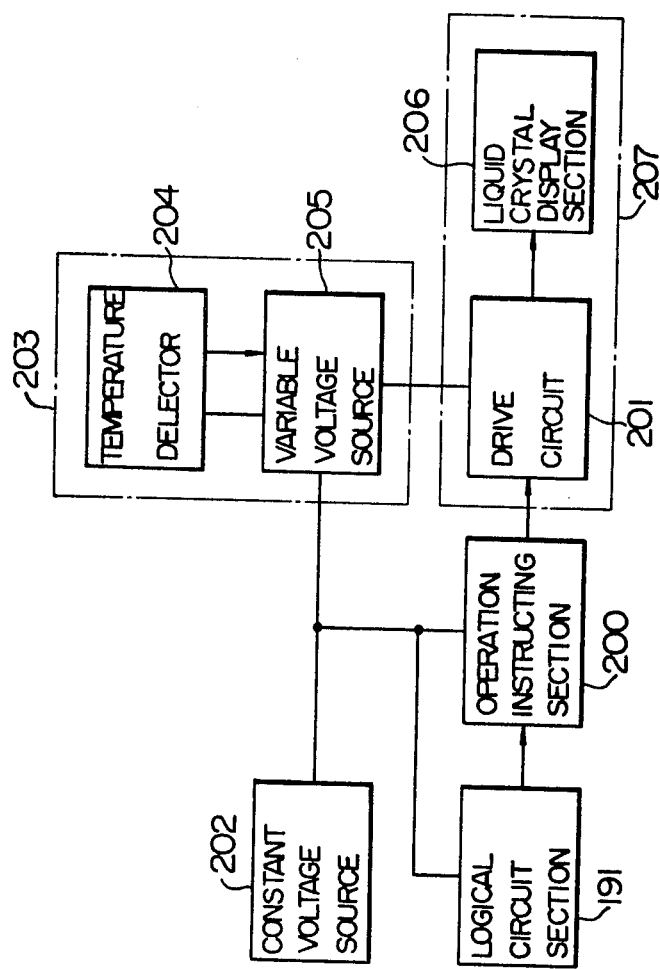
Figure 29:
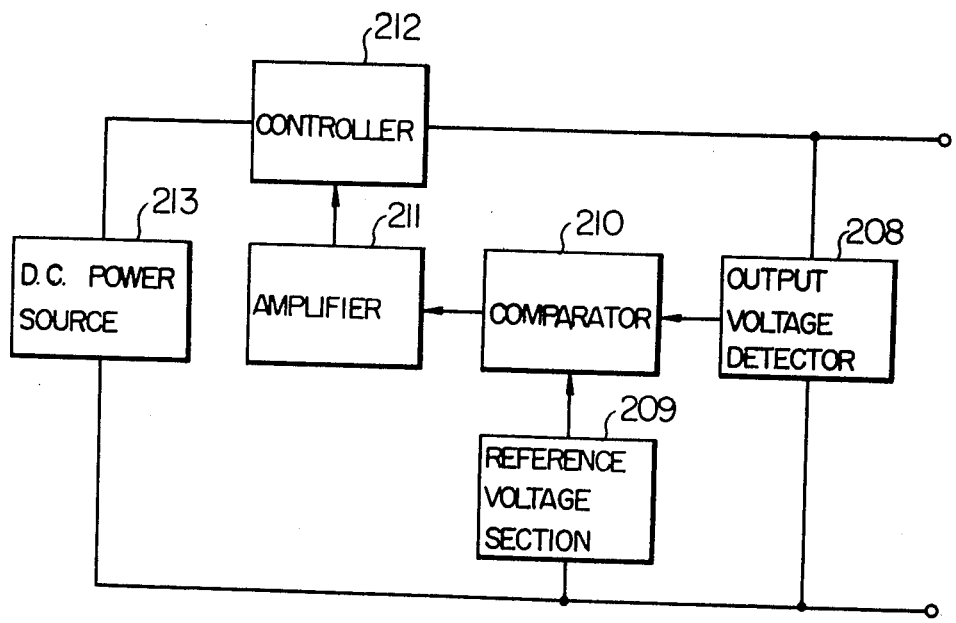
Figure 30:
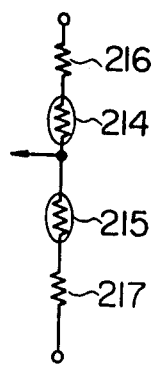
Figure 32A:
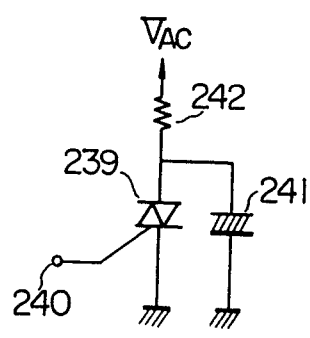
Figure 32B:
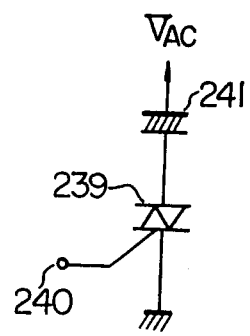
Figure 33A:
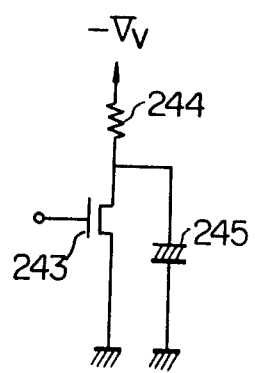
Figure 33B:
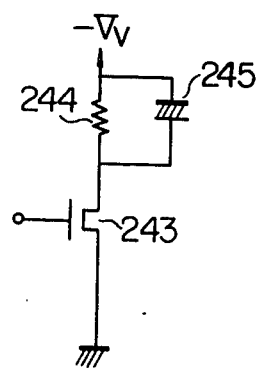
Figure 33C:
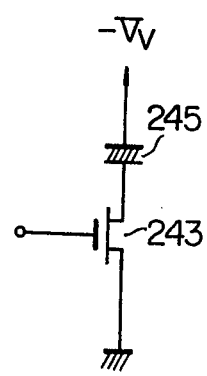
Figure 34A:
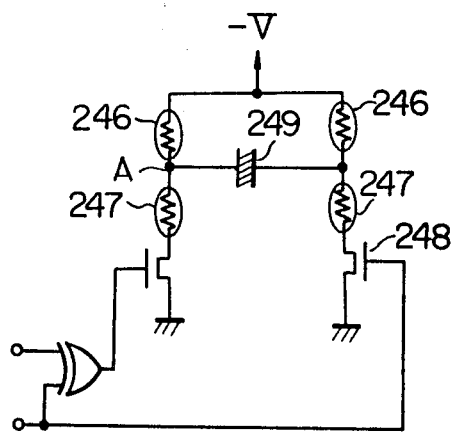
Figure 34B:
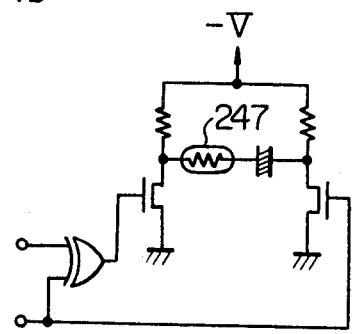
Figure 34C:
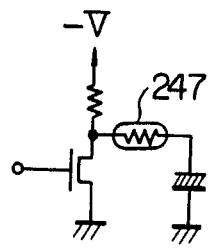
Figure 35A:
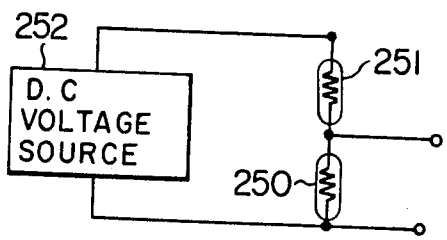
Figure 35B:
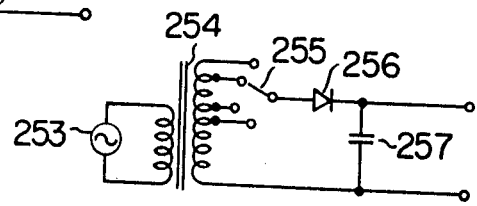
Figure 35C:
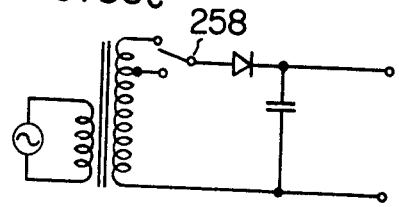
Figure 35D:
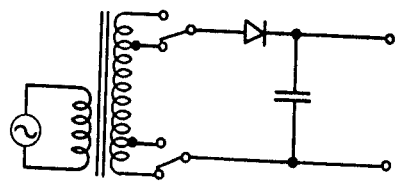
Figure 35E:
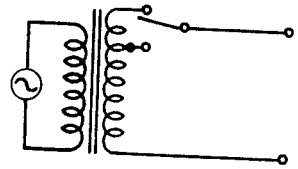

FIGS. 19 and 20 showing the electrode arrangement of the liquid crystal display board embodying the invention;

FIG. 21 is a schematic representation of a set-up for examining the light response characteristic of the liquid crystal;

FIG. 22 shows an example of the light response characteristic of the liquid crystal;

FIG. 23 is a graph showing the dependency of rise time when the scattering is brought about upon the operating voltage and frequency;

FIG. 24 is a graph showing the dependency of rise time upon the operating frequency and temperature;

FIG. 25 is a graph showing the dependency of rise time and erase time upon temperature;

FIG. 26 is a graph showing the dependency of the rise time upon the operating voltage and temperature;

FIG. 27 is a graph showing the relationship among the resistance of the liquid crystal, operating voltage, consumed power and rise time;

FIG. 28 is a block diagram showing a further embodiment of the liquid crystal display system according to the invention;

FIG. 29 is a block diagram showing an example of the variable voltage source section in the embodiment of FIG. 28;

FIG. 30 is a schematic showing an example of the output voltage detector in the circuit of FIG. 29;

FIGS. 31a to 31e show examples of the method of driving the liquid crystal in an a-c mode by using d-c a variable voltage source;

FIGS. 32a and 32b show examples of the method of driving the liquid crystal by using an a-c variable voltage source;

FIGS. 33a to 33c show examples of the method of driving the liquid crystal in a d-c mode by using a d-c variable voltage source;

FIGS. 34a to 34c show examples of the method of effectively varying the operating voltage by holding the supply voltage to the drive circuit constant; and FIGS. 35a to 35e show examples of the power source providing output voltage varying with temperature.

In order to facilitate the understanding of the invention, the background thereof will first be discussed in conjunction with the drawings prior to describing preferred embodiments of the invention.

Figure 1A:
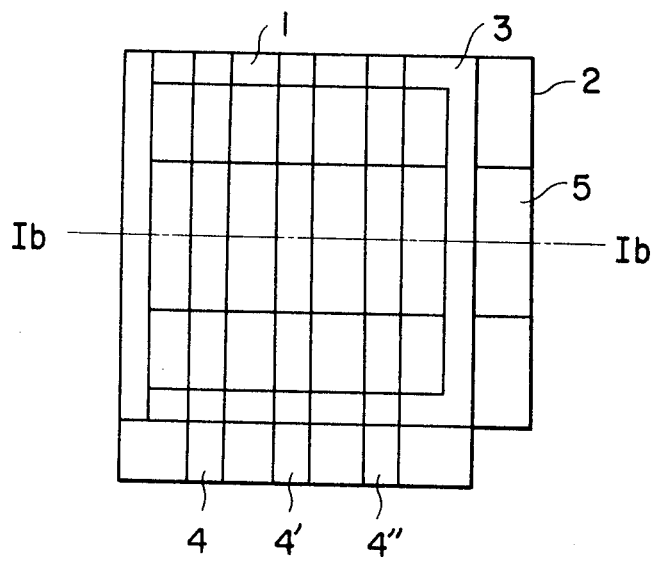
Figure 1B:
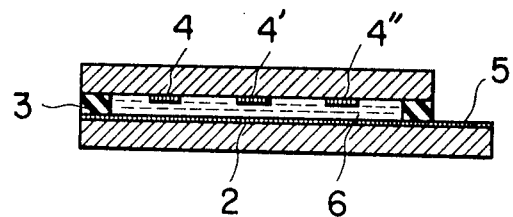

There are various types of display systems utilizing nematic liquid crystals. FIGS. 1a and 1b show the basic construction of a liquid crystal display board used in such systems. FIG. 1a is a plan view of the board, and FIG. 1b is a sectional view taken along line 1b — 1b in FIG. 1a.

As is illustrated, the board comprises parallel glass plates 1 and 2 spaced apart by several microns to several ten microns by a spacer 3, with the opposing faces of the glass plates 1 and 2 provided respectively with electrodes 4, 4' and 4'' and an electrode 5 formed by such means as deposition, and a liquid crystal layer 6 held between the glass plates 1 and 2.

To obtain a display on this liquid crystal display board, a d-c voltage or a-c voltage at a low frequency of the order of several 10 Hz is selectively applied between the electrodes 4, 4' and 4'' on one hand and the electrode 5 on the other hand.

It has been thought that the service life of the board is extended by operating it with a-c voltage to the order of several ten times to several hundred times compared to the case of operating it with d-c voltage. Accordingly, in order to be able to obtain dynamic scattering of light through the liquid crystal over a board temperature range, attempts have been made to apply an a-c voltage at a constant frequency capable of causing the scattering action of the crystal with a low resistivity thereof over the entire temperature range. It has also been believed that the dynamic scattering by the liquid crystal is extremely suppressed where the frequency of the a-c voltage is about several 100 Hz to several kHz. In the light of the above aspects, use has extensively been made of a-c voltage at considerably low constant frequencies. This is because the service life is thought to be greatly prolonged by driving the liquid crystal with such a low frequency a-c voltage compared to the case of driving it with a d-c voltage.

In another aspect, in their actual use the liquid crystal display systems are subject to considerable temperature changes. With temperature changes the resistivity of the liquid crystal varies. This indicates that the operating condition of the liquid crystal display system changes with temperature.

Figure 2:
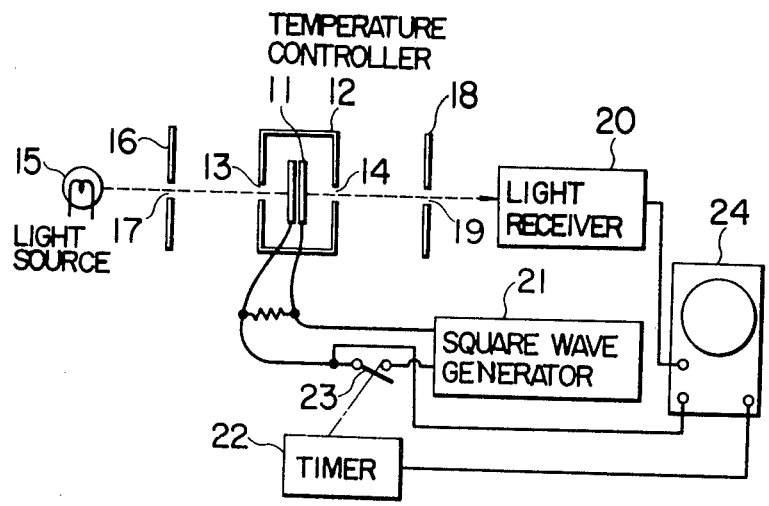
FIG. 2 is a schematic representation of a set-up for testing the performance of the same liquid crystal display board.

Light scattering characteristics of liquid crystals have been investigated with a set-up as shown in FIG. 2. In the Figure, numeral 11 designates a liquid crystal cell provided with a pair of transparent electrodes. It is held at a constant temperature by disposing it within a temperature controller 12. The device 12 is formed with a small window 13 for leading external light to the liquid crystal cell 11 and another small window 14 for leading the transmitted and scattered light to the outside. Numeral 15 designates a light source, and numeral 16 a front aperture plate interposed between a light source and temperature controller 12. The aperture plate 16 is formed with a central small hole or aperture 17. Numeral 18 designates a rear aperture plate, which is also formed with a central small hole or aperture 19 similar to the front aperture plate 16. Numeral 20 designates a light receiver using a photoelectric element, photocell or the like. The apertures 17 and 19 of the aperture plates 16 and 18 and the windows 13 and 14 of the temperature controller 12 are aligned with respect to a line connecting the light source 15 and light receiver 20.

Numeral 21 designates a square wave generator, whose output voltage and frequency are variable. Numeral 22 designates a timer having a switch 23, through which the square wave voltage is applied to the liquid crystal cell 11. Numeral 24 designates an oscilloscope, which is synchronized to the timer 22, and on which the waveforms of the outputs of the square wave generator 21 and light receiver 20 are displayed.

When the light source 15 is turned on, a substantially parallel light beam enters the liquid crystal cell 11 through the aperture plate 16. When the switch 23 is open, the incident light is transmitted through the liquid crystal cell 11, and the transmitted light is led through the aperture 19 of the aperture plate 18 to reach the light receiver 20. When the switch 23 is closed by the timer 22, the output voltage from the square wave generator 21 is impressed upon the liquid crystal cell 11.

With the above system, the amount of light received by the light receiver 20 is maximum in the absence of voltage applied to the liquid crystal cell 11. When the voltage is applied, the incident light is scattered. The scattered light is mostly blocked by the aperture plate 18, so that the amount of light reaching the light receiver 20 is greatly reduced.

Figure 3:
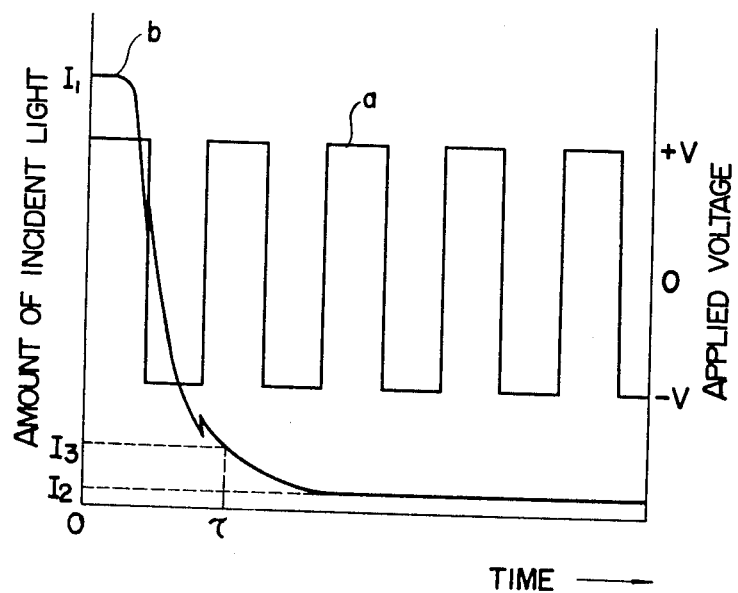
FIG. 3 shows a typical example of the rise time characteristic of the liquid crystal display board.

FIG. 3 shows how the liquid crystal cell 11 is rendered from its transparent state into non-transparent state by closing the switch 23. Indicated at $a$ is the waveform of the output voltage of the square wave generator 21. With this voltage, the amount of light incident on the light receiver 20 is reduced with time as shown by curve $b$. In order to facilitate the discussion of this effect of light scattering it is here convenient to define a rise time $\tau$, which is the time required until the amount of incident light is reduced to $I_3$ satisfying a relation $$(I_1 - I_3)/(I_1 - I_2) = 0.9$$

where $I_1$ is the maximum amount of incident light and $I_2$ is the minimum amount of incident light in the settled scattering state.

Figure 4:
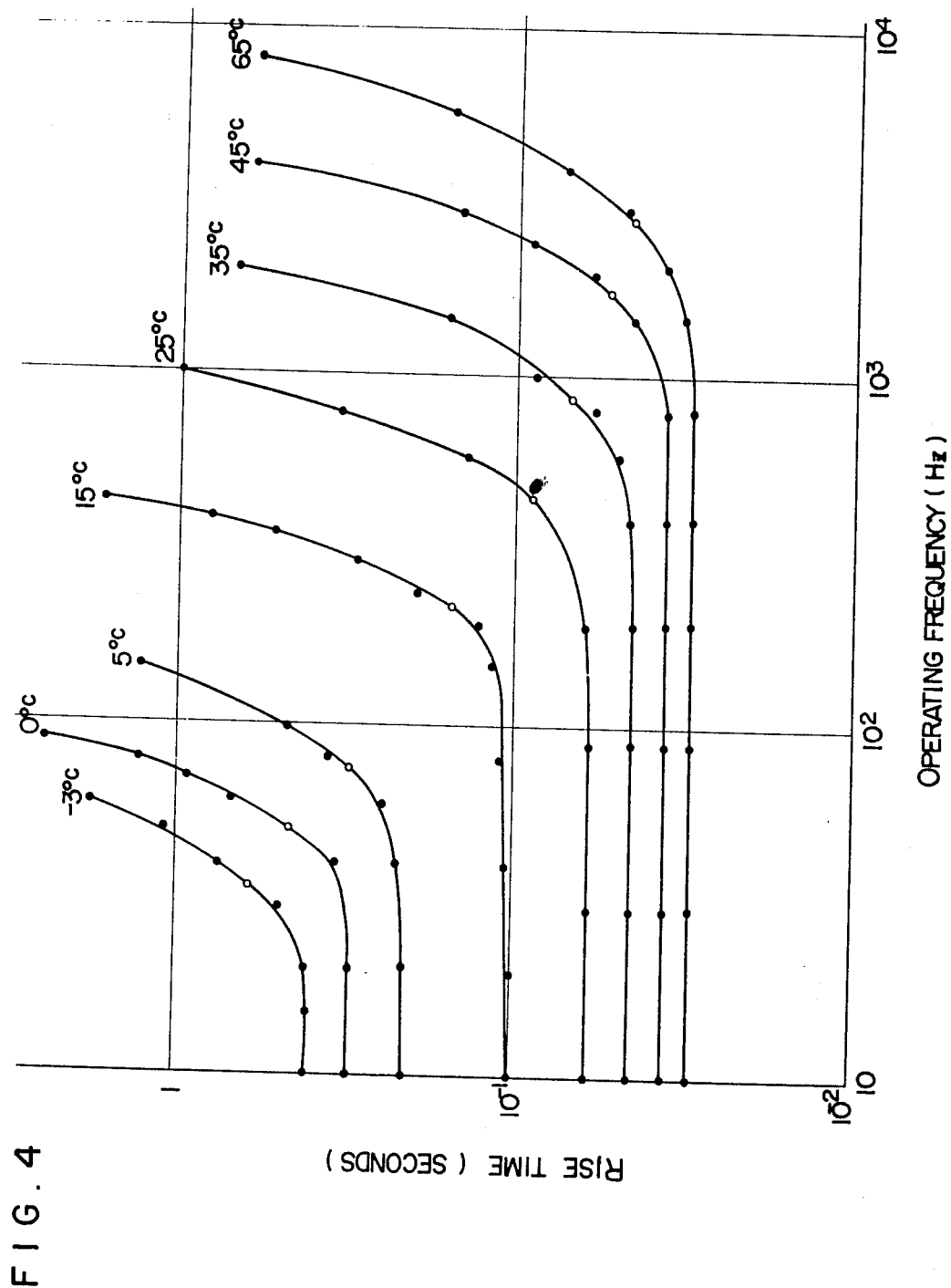
FIG. 4 is a graph showing an example of the relation between rise time and operating frequency of a nematic liquid crystal.

FIG. 4 shows the relationship between the rise time $\tau$ and the frequency of the square wave voltage for various values of the temperature of the liquid crystal cell 11 in the above set-up. Here, the cell used a liquid crystal prepared by mixing equal quantitites of materials represented by respective general formulas

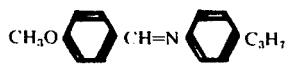

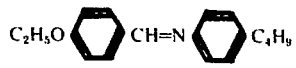

and

and adding an additive to the mixture to set the resistivity at a temperature of 25°C to $5 \times 10^8$ $\Omega \cdot$cm, and the applied voltage is set to a constant effective value of 20 volts.

It will be apparent from the Figure that at any temperature the rise time $\tau$ has a constant value provided the frequency is sufficiently low. With increase in frequency beyond a certain frequency, however, the rise time $\tau$ is increased, and the phenomenon of the scattering ultimately disappears. Frequencies corresponding to circle marks are defined as threshold frequency, at which the rise time is increased by 50 percent with respect to the constant rise time for frequencies below the afore-mentioned certain frequency. For example, the threshold frequency is 33 Hz when the temperature is −3°C, while it is increased to 2.8 kHz at a temperature of 55°C. This means an increase of the threshold frequency by about 100 times with a temperature change of a mere 60°C.

Figure 5:
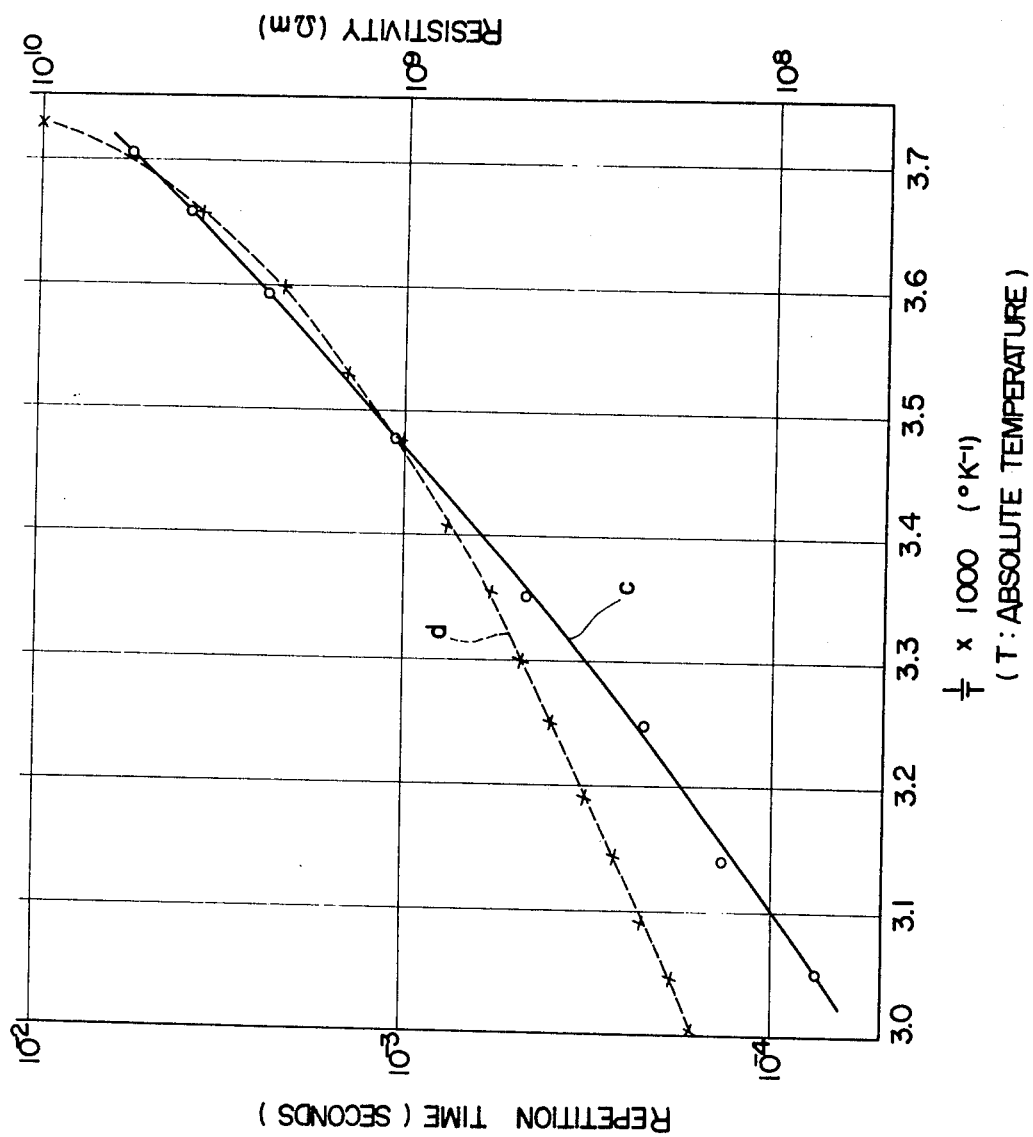
FIG. 5 is a graph showing the relation between repetition time of the operating voltage and temperature of the liquid crystal and relation between resistivity and temperature of the liquid crystal.

FIG. 5 shows a relation between the resistivity $\rho$ of the afore-mentioned liquid crystal and the reciprocal of the absolute temperature T thereof, as indicated by solid curve $c$. It will be seen that similar to the afore-mentioned threshold frequency the resistivity of the liquid crystal greatly changes with changing temperature. For example, with a temperature change from −3°C to 55°C the resistivity is reduced to about 1/70.

Figure 6:
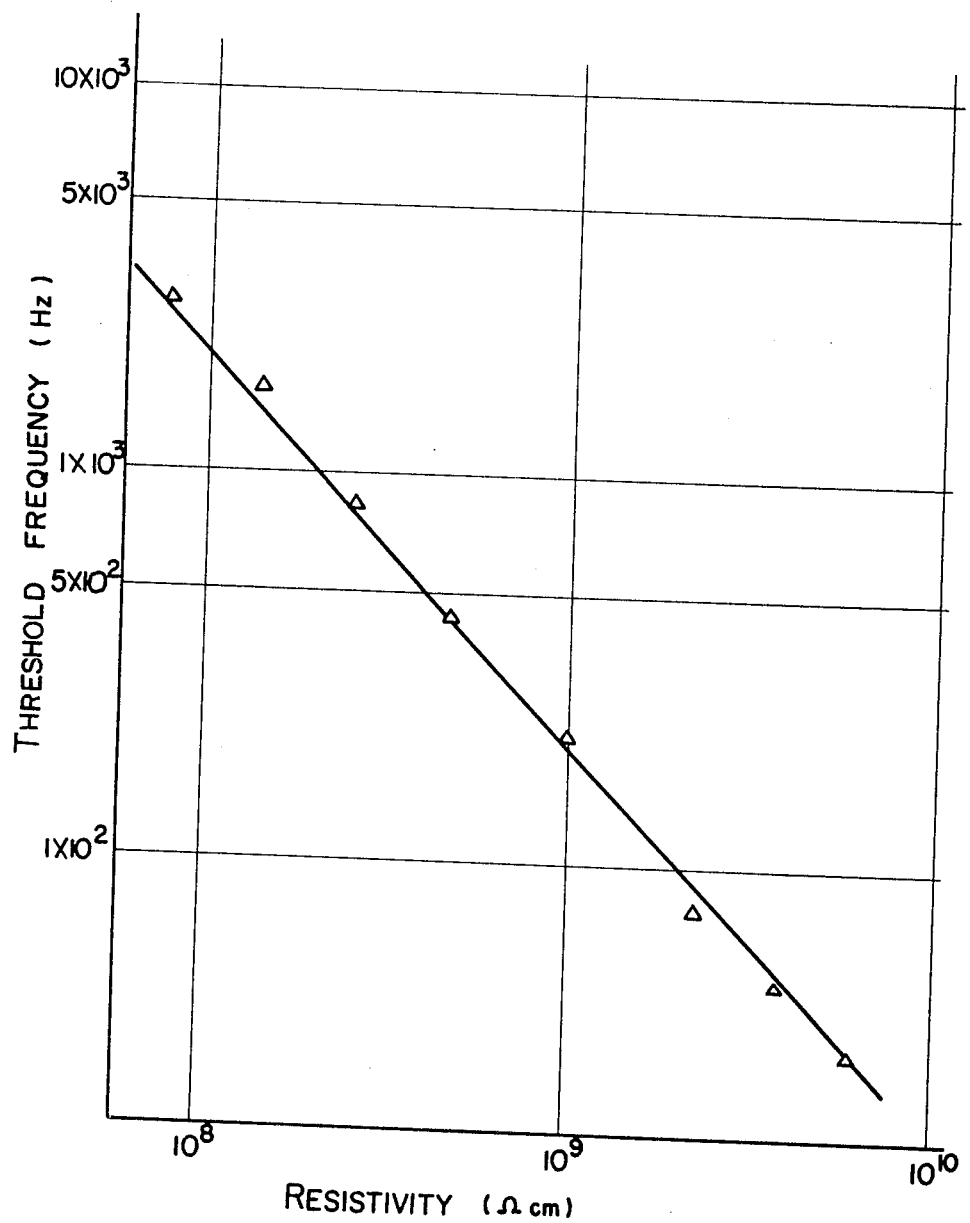
FIG. 6 is a graph showing the relation between threshold frequency of the operating voltage and resistivity of the liquid crystal.

FIG. 6 shows a relation between the resistivity $\rho$ of the afore-mentioned liquid crystal and the threshold frequency. It will be seen that a substantially reciprocal relation holds between both variables.

It has been experimentally confirmed that similar temperature dependency of the resistivity $\rho$ and reciprocal relation between resistivity $\rho$ and threshold frequency to those mentioned above also hold for other liquid crystals than the afore-mentioned one. Further, the reciprocal relation between resistivity $\rho$ and threshold frequency holds not only when the temperature is varied but also when the resistivity is varied by varying the amount of the resistivity control agent added to the liquid crystal.

In order to be able to drive the liquid crystal into the dynamic scattering state with an a-c voltage over a broad temperature range, it is necessary to determine the lower limit of the operating temperature and the resistivity and threshold frequency at that temperature. If the lowest operating temperature is set to, for instance, −3°C, the resistivity of the liquid crystal at this temperature is $5.6 \times 10^9$ $\Omega \cdot$ cm from FIG. 5, and with the resistivity of $5.6 \times 10^9$ $\Omega$ cm the corresponding threshold frequency is about 35 Hz from FIG. 6. In this case, with a temperature rise to 55°C the resistivity is reduced to about $7.8 \times 10^7$ $\Omega \cdot$cm, and the threshold frequency corresponding to this resistivity is about 2.5 kHz. Therefore, if it is designed to use the liquid crystal at a constant operating frequency of, for instance, 20 Hz, with the lower operating temperature set to −3°C, the operating frequency will be below one hundredth fraction of the threshold frequency when the temperature is changed to 55°C. With such operating frequency which is likely to be below the threshold frequency to the order of two decimal places, a pronounced extension of the service life of the liquid crystal compared with that in the case of d-c operation would not be obtained in spite of the a-c operation. In fact, experiments conducted on many liquid crystal cells prepared from the liquid crystal of the afore-mentioned characteristics and operated at a temperature of 50°C to test their service life proved that the majority of them became useless within two weeks of use at the operating frequency of 20 Hz. On the other hand, from tests carried out with the operating frequency set to 500 Hz a noticeable difference in the service life compared to the case of the operating frequency of 20 Hz was confirmed.

It may be thought from the above that while several hundred times as long service life as that by d-c operation has been reported to be obtained by a-c operation, this is because the resistivity of the reported liquid crystal was higher than about $1 \times 10^9$ $\Omega \cdot$ cm and the operating frequency was 60 Hz close to the threshold frequency at room temperature.

The present invention is based on the results of the study of the afore-mentioned characters of liquid crystals. According to the invention, the temperature of the liquid crystal display board or the neighborhood thereof is detected for controlling the frequency of an a-c voltage source to a frequency equal to or close to the threshold frequency corresponding to the detected temperature. For example, where the relation between the resistivity and reciprocal of the absolute temperature is as shown by curve $c$ in FIG. 5, the frequency of the power source is varied according to the temperature such that there holds a relation identical with or similar to the relation between the reciprocal of the operating frequency; that is, repetition time and reciprocal of the absolute temperature of the curve $c$ in FIG. 5. By so doing, it is made possible to broaden the operating temperature coverage of the liquid crystal display system and extend the service life thereof.

Figure 7:
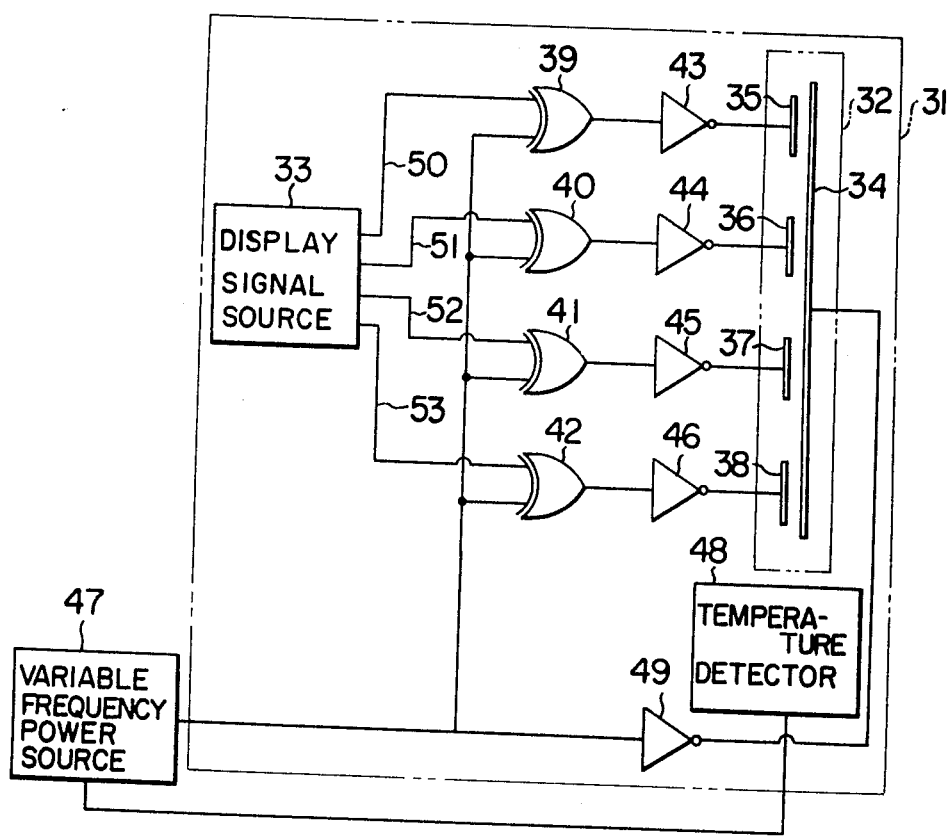
FIG. 7 is a block diagram showing one embodiment of the liquid crystal display system according to the invention.

FIG. 7 is a block diagram outlining the construction of one embodiment of the invention. In the Figure, reference numeral 31 designates a liquid crystal display section, numeral 32 a liquid crystal display board, and numeral 33 a display signal source. The liquid crystal display board 32 has a common electrode 34 and electrodes 35 to 38 constituting segments of characters or the like. Exclusive OR gates 39 to 42 in series with respective inverters 43 to 46 are provided between the display signal source 33 and the respective electrodes 35 to 38. Numeral 47 designates a power source providing output voltage at a variable frequency corresponding to the temperature of the liquid crystal display board 32 or the neighborhood thereof. Its output voltage is added to the exclusive OR gates 39 to 42, which also receive respective display signals from the display signal source 33 to take the exclusive OR of their respective inputs. Numeral 48 designates a temperature detector such as a thermistor, and numeral 49 an inverter for inverting the output voltage of the variable frequency power source 47 to couple the inverted voltage to the common electrode 34 of the liquid crystal display board 32.

It is now assumed that output "1" prevails at an output terminal 50 of the display signal source 33 while output "0" prevails at the other output terminals 51 to 53. In this situation, if the output of the variable frequency power source 47 is 0, the exclusive OR gate 39 provides output 1 while the other exclusive OR gates 40 to 42 provide output 0. These outputs are inverted by the inverters 43 to 46 which serve as liquid crystal drive voltage amplifier, so that the potential on the electrode 35 of the liquid crystal display board 32 corresponds to 0 while the potentials on the other electrodes 36 to 38 correspond to 1. Meanwhile, the potential on the common electrode 34 corresponds to 1 since the output of the variable frequency power source 47 is inverted on its way to the common electrode. This means that only the electrode 35 is at a negative potential while the other electrodes 36 to 38 are at the same potential with respect to the common electrode 34. As a result, assuming that output voltages 1 and 0 of the inverters 43 to 46 are respectively V volts and 0 volts, −V volts is selectively impressed across the liquid crystal layer only for a portion thereof between the electrodes 34 and 35, so that dynamic scattering takes place only in this portion.

When the output of the variable frequency power source 47 subsequently changes from 0 to 1 while the potentials at the output terminals 50 to 53 remain unchanged, the potential on the common electrode 34 is changed from 1 to 0. At the same time, the potential on the electrode 35 is changed to 1 while the potentials on the electrodes 36 to 38 are changed to 0. As a result, the opposite polarity voltage of +V volts to the previous one appears only between the common electrode 34 and electrode 35.

Thus, so long as the potentials at the output terminals 50 to 53 remain unchanged, an alternating voltage of alternating positive and negative polarities corresponding to the output levels 1 and 0 of the variable frequency power source 47 prevails between the electrodes 34 and 35, and with this applied alternating voltage dynamic scattering takes place in a portion of the liquid crystal layer between the electrodes 34 and 35.

With a change of the ambient temperature the operating frequency suited to drive the liquid crystal display board 32 changes as has been mentioned earlier. The variable frequency power source 47 serves the role of controlling this frequency. An example of its construction is shown in FIG. 8.

Figure 8:
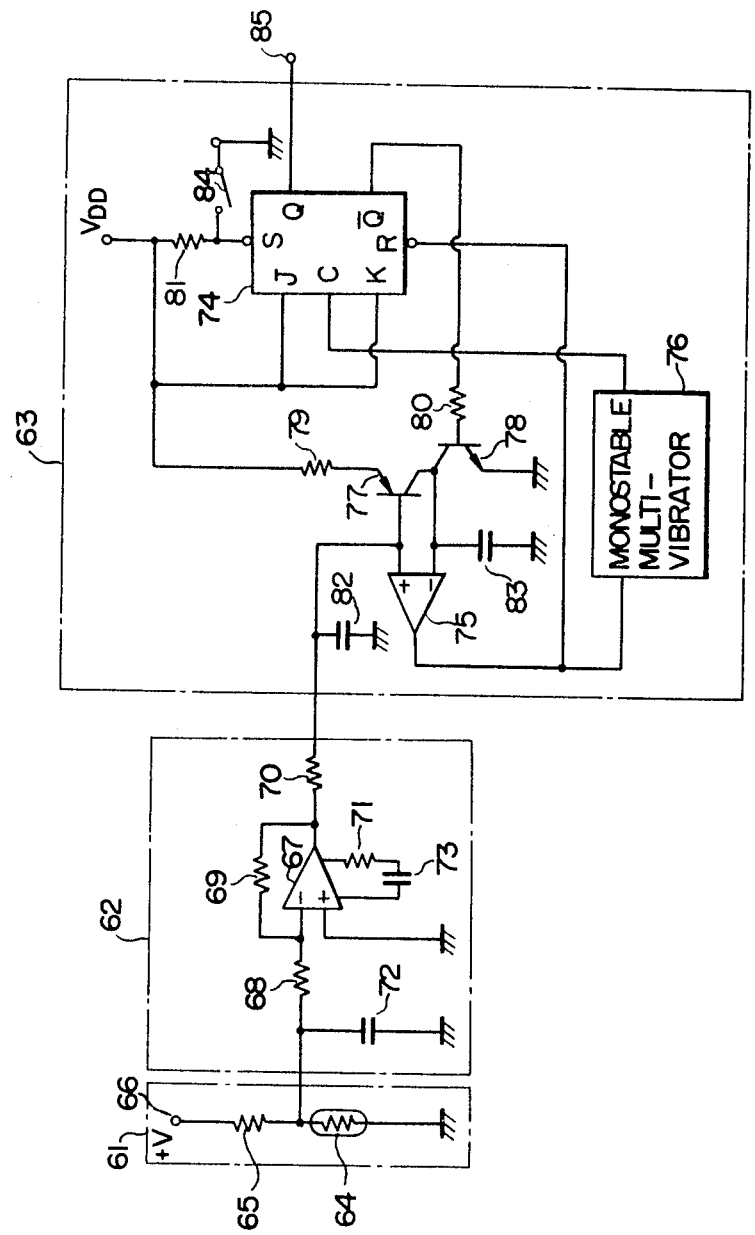
FIG. 8 is a schematic showing part of the embodiment of FIG. 7.

In FIG. 8, numeral 61 designates a temperature detector section, numeral 62 an amplifier section, and numeral 63 an oscillator section. The temperature detector section 61 consists of a series circuit of a temperature-sensitive resistive element such as a thermistor 64 and a resistor 65 and serving as a voltage divider to supply a division of a fixed voltage prevailing at a terminal 66 to the next stage amplifier circuit 62.

The amplifier section 62 comprises an amplifier 67, resistors 68 to 71 and capacitors 72 and 73, and it amplifies the output of the temperature detector section 61.

The oscillator section 63 comprises an R-S flip-flop 74, a voltage comparator 75, a monostable multivibrator 76, a constant current transistor 77, and a switching transistor 78, resistors 79 to 81, capacitors 82 and 83 and a switch 84. The voltage comparator 75 produces an output corresponding to either 1 or 0 depending upon the magnitude relation between voltages impressed upon its two input terminals.

The operation of the above construction will now be described in connection with FIG. 9. Upon closure of the switch 84 in the oscillator section 63 the set terminal S of the flip-flop 74 is grounded, as shown at $a$ in FIG. 9. As a result, the output Q of the flip-flop 74 is changed to 0, as shown at $b$ in FIG. 9, thus cutting off the transistor 78 to cause the charging of the capacitor 83 with the collector current through the transistor 77. The terminal voltage across the capacitor 83 builds up according to a time constant determined by the collector current through the constant current transistor 77, as shown at $c$ in FIG. 9. If this terminal voltage is lower than the output voltage of the amplifier circuit 62, i.e., the voltage across the capacitor 82, the voltage comparator 75 provides output 1. When the aforementioned terminal voltage becomes equal to the terminal voltage across the capacitor 82, the voltage comparator output is changed from 1 to 0, as shown at $d$ in FIG. 9. With this negative pulse the flip-flop 74 is reset, changing its output Q to 1 again to trigger the transistor 78. As a result, the capacitor 83 is discharged through the transistor 78.

Figure 9:
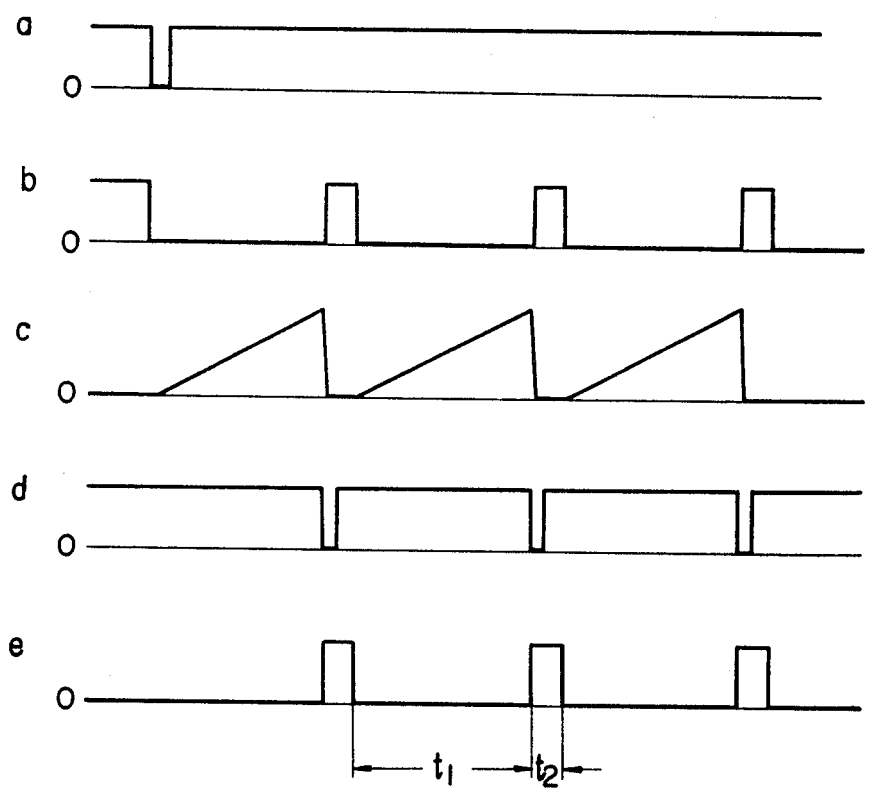
FIG. 9 is a waveform chart to illustrate the operation of the circuit of FIG. 8.

Meanwhile, upon inversion of the output of the voltage comparator 75 into 0 the monostable multivibrator 76 is triggered and inverted into a quasi-stable state, as shown at $e$ in FIG. 9. Before the monostable multi-vibrator 76 recovers its stable state from the quasi-stable state according to its time constant, the discharging of the capacitor 83 is already completed. Thus, with the change of the output of the monostable multi-vibrator 76 due to the returning thereof to the stable state the output Q of the flip-flop 74 is changed to 0 again, thus again cutting off the transistor 78 to cause the charging of the capacitor 83. The above sequence of events is repeated with the voltage comparator 75 actuated when the terminal voltage across the capacitor 83 becomes equal to that across the capacitor 82.

In the above operation, if the resistance of the thermistor 64 changes, causing a corresponding change in the division output of the voltage divider of thermistor 64 and resistor 65, the frequency of the output produced at the output terminal of the oscillator section 63 is changed correspondingly. In other words, the oscillation frequency depends upon and changes with temperature.

More particularly, with increase of temperature the resistance of the thermistor 64 is reduced to reduce the input voltage to the amplifier section 62, thus reducing the output voltage thereof, i.e., the voltage across the capacitor 82. conversely, with a reduction of temperature the output voltage of the amplifier section 62 is increased. It will be thus apparent that with an increase of temperature the terminal voltage across the capacitor 82 is reduced to increase the collector current through the transistor 77, so that the charging time of the capacitor 83 is reduced. In addition, the terminal voltage across the capacitor 82 at the end of the charging is also reduced. Thus, the period of the output change of the voltage comparator 75 is reduced to increase the oscillation frequency. With a decrease of temperature the terminal voltage across the capacitor 82 at the end of the charging is increased while the collector current through the transistor 77 is reduced accordingly, so that the oscillation frequency of the oscillator section 63 is reduced.

A relation between the repetition time of the output of the circuit 63 and reciprocal of absolute temperature T as shown by dashed curve $d$ in FIG. 5, closely simulating the relation of curve $c$ between the resistivity $\rho$ and absolute temperature, was obtained by using a monostable multi-vibrator with the quasistable period $t_2$ set to about 10 microseconds as the multi-vibrator 76 and constructing the oscillator section 63 with the elements of the following specifications:

| Flip-flop 74: | DM7476 (a product by National Semiconductor Corporation) |
| --- | --- |
| Voltage comparator 75: | PA7710 (a product by Filcoford Corporation) |
| Transistor 77: | 2SA546 (a product by Matsushita Electronics Corporation) |
| Transistor 78: | 2SC828 (a product by Matsushita Electronics Corporation) |
| Resistor 79: | 10 k$\Omega$ |
| Resistor 80: | 3.9 k$\Omega$ |
| Resistor 81: | 10 k$\Omega$ |
| Capacitor 82: | 33 $\mu$F |
| Capacitor 83: | 0.66 $\mu$F |

As is apparent from the plot, the repetition time was about 6 milliseconds, corresponding to about 167 Hz, at a temperature of $-3°C$ ($270°K$) and about 0.16 millisecond, corresponding to about 6.3 kHz, at a temperature of $55°C$ ($328°K$). Actually, the frequency was divided to $\frac{1}{8}$ through a frequency divider connected to the terminal 85 to obtain the operating frequency.

Figure 10:
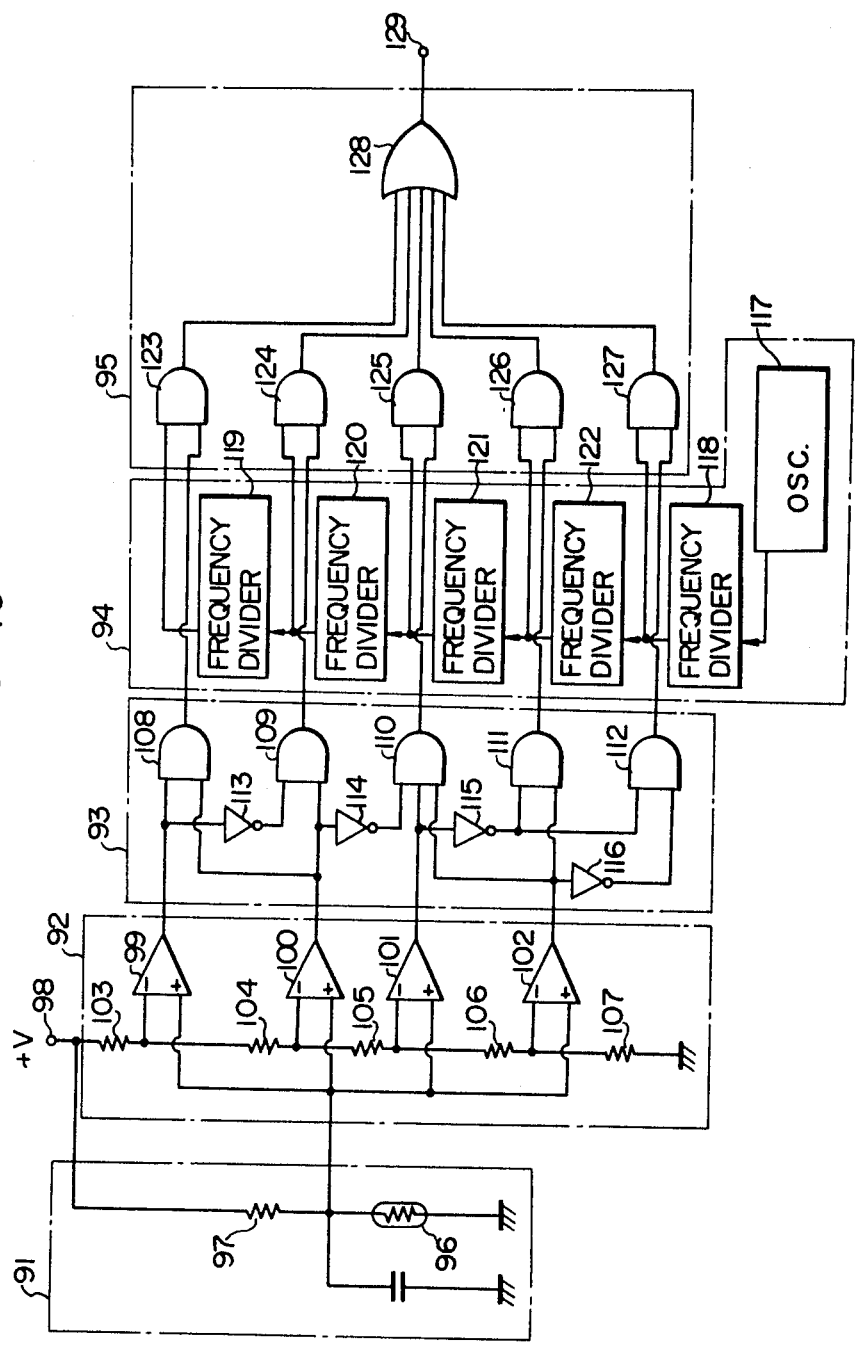
FIG. 10 is a schematic showing a different example of the same part.

FIG. 10 shows another example of the variable frequency power source 47. In the Figure, reference numeral 91 designates a temperature detector section, numeral 92 a voltage comparator section, numeral 93 a frequency specifying section, numeral 94 an oscillator section, and numeral 95 a frequency selecting section.

The temperature detector section 92 consists of a thermistor 96 and a resistor 97 which constitute a voltage divider to divide a fixed voltage applied between a terminal 98 and ground. The voltage comparator section 92 comprises a plurality of, for instance four, voltage comparators 99 to 102 and resistors 103 to 107 for dividing the voltage applied between the terminal 98 and ground. The voltage comparators 99 to 102 receive at one of their pairs of input terminals respective different voltages provided through the resistors 103 to 107, and they have their respective other input terminals commonly connected to the output terminal of the temperature detector section 91. The frequency specifying section 93 comprises AND gates 108 to 112 and inverters 113 to 116. It supplies only the output that is higher than and closest to the division voltage across the thermistor 96 to the next stage. The oscillator section 94 comprises an oscillator 117 and frequency dividers 118 to 122. In a specific example of this section, the oscillator 117 has a repetition frequency of 40 kHz, the frequency divider 118 has a frequency division factor of 1/16 to provide a frequency of 2.5 kHz, and the frequency dividers 119 to 122 each have a frequency division factor of $\frac{1}{4}$, providing the lowest frequency of about 10 Hz. The frequency selecting section 95 comprises AND gates 123 to 127 and an OR gate 128. The AND gates 123 to 127 selectively pass the respective outputs of the oscillator section 94 according to the associated outputs of the frequency specifying section 93, and the selected output is led through the OR gate 128 to an output terminal 129.

In this construction, the output level of each of the voltage comparators 99 to 102 is adapted to change from 0 to 1 when the output voltage of the temperature detector section 91 appearing at one of its input terminals exceeds the voltage applied to the other input terminal.

When the ambient temperature is increased, the resistance of the thermistor 96 is reduced. If the output voltage of the temperature detector section 91 is lower than the terminal voltage across the resistor 107, the output level of not only the voltage comparator 102 but also the other voltage comparators 99 to 101 is 0. In this case, the outputs of the voltage comparators 101 and 102 are inverted into 1 by the respective inverters 115 and 116, whose outputs are coupled to both the input terminals of the AND gate 112, while at least one input 0 is present at each of the other AND gates 108 to 111. Thus, only the AND gate 112 produces output 1, so that the associated next stage AND gate 127 permits the output of the frequency divider 118 dividing the output frequency of the oscillator 117 to the OR gate 128, which thus provides output of the highest frequency to the output terminal 129.

When the output voltage of the temperature detector section 91 exceeds the terminal voltage across the resistor 107 with a slight fall of temperature, only the output level of the voltage comparator 102 changes from 0 to 1, so that only the AND gate 111 simultaneously receives signals 1 at all the input terminals. As a result, the output of the frequency divider 122 is permitted through the AND gate 126 and OR gate 128 to the output terminal 129. With further fall of temperature the AND gates 125 and 124 are consequently rendered into the conduction state, progressively causing voltages at frequencies corresponding to temperature to appear at the output terminal 129.

When the temperature is lowered to such an extend that all the voltage comparators 99 to 102 come up with output of level 1, only the AND gate 108 produces output 1, so that the output of the frequency divider 119 is permitted through the AND gate 123 and OR gate 128 to the output terminal 129.

Figure 11:
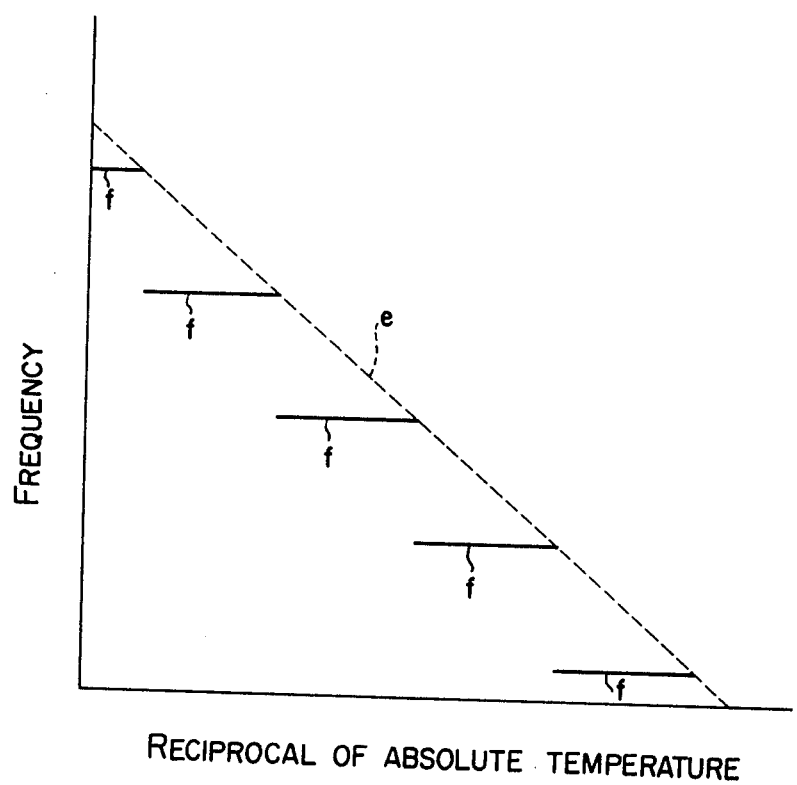
FIG. 11 is a graph showing a characteristic of the circuit of FIG. 10.

FIG. 11 shows the relation between output frequency and temperature in the above operation. In the Figure, dashed line $e$ represents the relation between threshold frequency and temperature while solid lines $f$ represent the characteristic of the circuit of FIG. 10. Sufficient results can be obtained by varying the output frequency stepwise in this way at predetermined temperature intervals such that the output frequency will not greatly differ from the threshold frequency.

Figure 12:
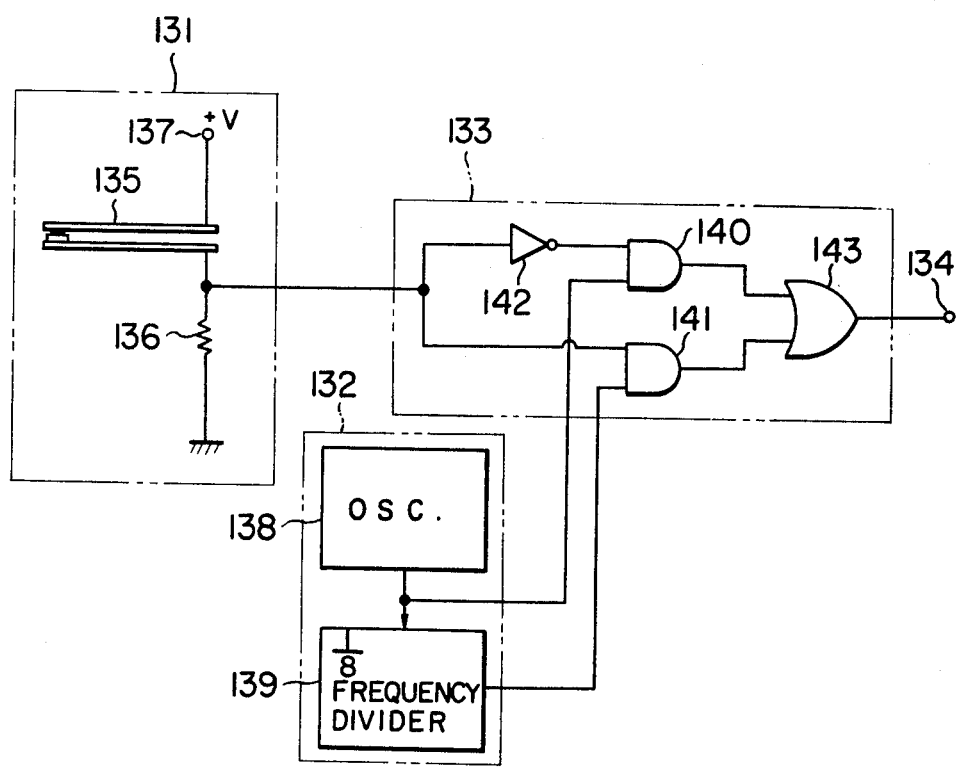
FIG. 12 is a schematic showing a further example of the afore-mentioned part.

FIG. 12 shows a further example of the variable frequency power source 47. This example is a simplified modification of the preceding example of FIG. 10. It is based on the facts that with the presently available liquid crystal material the greatest resistance change ratio is about 100 if the operating temperature range is substantially from −3°C to 55°C and that in such case the deviation of the operating frequency from the threshold frequency may be held within 1/10 even with two predetermined optional operating frequencies. In the Figure, numeral 131 designates a temperature detector section, numeral 132 a two-frequency oscillator section, numeral 133 a frequency selecting section, and numeral 134 an output terminal.

The temperature detector section 131 comprises a bimetal switch 135 adapted to be opened when a temperature of, for instance, 20°C is exceeded and a resistor 136, these elements being serially inserted between a terminal 137 and ground. The two-frequency oscillator section 132 comprises an oscillator 138 oscillating at a frequency of, for instance, 200 Hz and ⅛ frequency divider 139. The frequency selecting section 133 comprises AND gates 140 and 141, an inverter 142 and an OR gate 143, and it selectively passes the output of either oscillator 138 or frequency divider 139 according to the output of temperature detector section 131.

In operation, if the temperature is above 20°C, the bimetal switch 135 is "off", the level of the input to the frequency selecting section 133 is 0. In this state, the output of the oscillator 138 is permitted through the AND gate 140, which also receives the output of the inverter 142 at its other input terminal, to the OR gate 143 and appears at the output terminal 134.

When the temperature becomes lower than 20°C, the bimetal switch 135 is closed, so that at this time the output of the frequency divider 139 is permitted through the AND gate 141.

The bimetal switch 135 may be replaced with other temperature sensitive elements such as a thermistor. Also, it is possible to use a switching circuit consisting of a combination of a temperature sensitive element and a Schmitt circuit.

Further, if the display state of the liquid crystal cell flickers with an a-c voltage at a frequency of, for instance 25 Hz applied at a temperature in a low temperature range, a d-c power source may be used in place of the low frequency power source.

There are hysteresis phenomena that are involved in the operation of bimetal switches and Schmitt circuits. Such hysteresis phenomena may be effectively utilized where the operating temperature fluctuates around the frequency switching temperature to prevent frequent switching of frequencies so as to greatly reduce flicker due to the switching.

As has been mentioned earlier, the resistivity of the liquid crystal, and hence the threshold frequency or frequency suited to drive the liquid crystal, varies not only with the temperature of the liquid crystal display board but also according to the amount of the resistivity control agent added to the liquid crystal.

Figure 13:
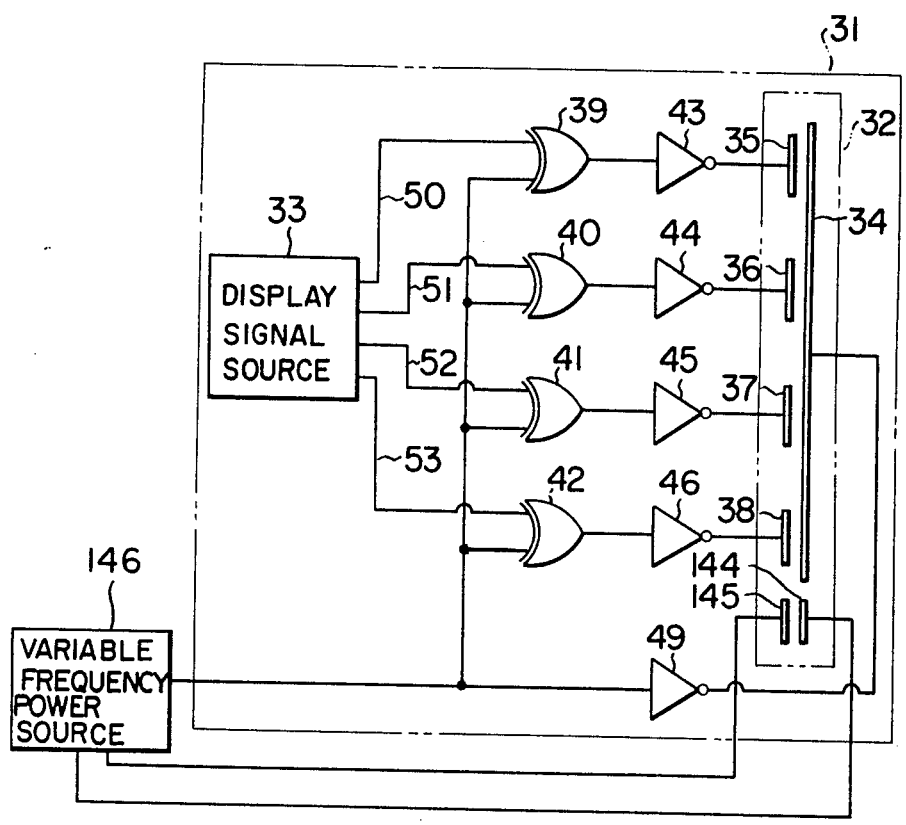
FIG. 13 is a block diagram showing another embodiment of the liquid crystal display system according to the invention.

FIG. 13 shows another embodiment of the invention, in which the resistance of the liquid crystal is directly detected for controlling the operating frequency to a frequency equal to or close to the threshold frequency corresponding to the detected resistance. In the Figure, the same reference numerals as those in FIG. 7 refer to like parts. This embodiment differs from the embodiment of FIG. 7 in that its liquid crystal display board 32 has liquid crystal resistance detection electrodes 144 and 145. Numeral 146 designates a variable frequency power source providing output voltage at a variable frequency corresponding to the detected resistance between the electrodes 144 and 145 of the liquid crystal display board 32. Its output voltage is added to the exclusive OR gates 39 to 42, which also receive respective display signals from the display signal source 33 to take the exclusive OR of their respective inputs. The operation of this construction is basically the same as that of the embodiment of FIG. 7. With a change of the ambient temperature the resistance between the electrodes 144 and 145 changes to change the operating frequency suited to drive the liquid crystal display board 32 as has been mentioned earlier. The frequency control is done by the variable frequency power source 146, whose one example is shown in FIG. 14.

Figure 14:
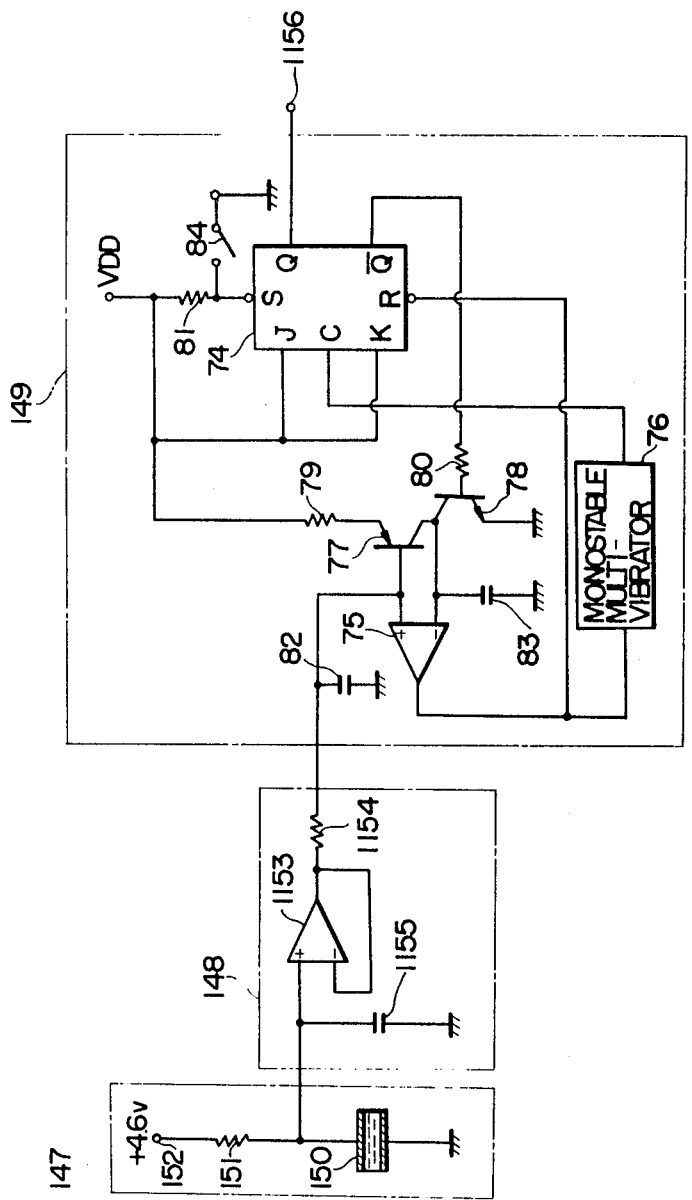
FIG. 14 is a schematic showing part of the embodiment of FIG. 13.

In FIG. 14, numeral 147 designates a resistance detector section, numeral 148 an amplifier section, and numeral 149 an oscillator section.

The resistance detector section 147 consists of a series circuit of liquid crystal cell 150 and resistor 151. It acts as a voltage divider to supply a division of a fixed voltage applied to a terminal 152 to the next stage amplifier section 148. The liquid crystal cell 150 may be integral with the liquid crystal display board 32 as shown in FIG. 13, or it may be a separate unit of the same liquid crystal material and disposed in the vicinity of the liquid crystal display board 32. The amplifier section 148 comprises an amplifier 1153, a resistor 1154 and a capacitor 1155, and it amplifies the output of the resistance detector section 147. In the circuit 147 the liquid crystal cell 150 is a high impedance element, so a function of impedance conversion such as that of an emitter follower or source follower may be provided if it is found necessary. The oscillator section 149 has the same construction as the oscillator section 63 shown in FIG. 8, so its components are designated by the same reference numerals. Numeral 1156 designates a terminal.

The operation of the above construction is basically the same as that of the construction of FIG. 8 except that the resistance of the liquid crystal is detected here.

With a change of the resistance of the liquid crystal cell 150 due to a temperature change the voltage supplied to the amplifier section 148 is changed to change the terminal voltage across the capacitor 82. Thus, the oscillator section 149 provides at the terminal 1156 an output at a frequency corresponding to the division voltage provided from the voltage divider of liquid crystal cell 150 and resistor 151. In other words, the oscillation frequency depends upon and changes with the resistance of the liquid crystal cell 150.

With decrease of the resistance of the liquid crystal cell 150 due to a temperature rise the input voltage to the amplifier section 148 is reduced, thus reducing the output voltage thereof, i.e., the voltage across the capacitor 82. Conversely, with an increase of the resistance the output voltage from the amplifier section 148 is increased. It will thus be apparent that with a reduction of the resistance of the liquid crystal cell 150 the terminal voltage across the capacitor 82 is reduced to increase the collector current through the transistor 77, so that the charging time of the capacitor 83 is reduced. In addition, the terminal voltage across the capacitor 82 at the end of the charging is also reduced. Thus, the period of the output change of the voltage comparator 75 is reduced to increase the oscillation frequency. With an increase of the resistance the terminal voltage across the capacitor 82 at the end of the charging is increased, reducing the collector current through the transistor 77, so that the oscillation frequency of the oscillator section 149 is reduced.

Figure 15:
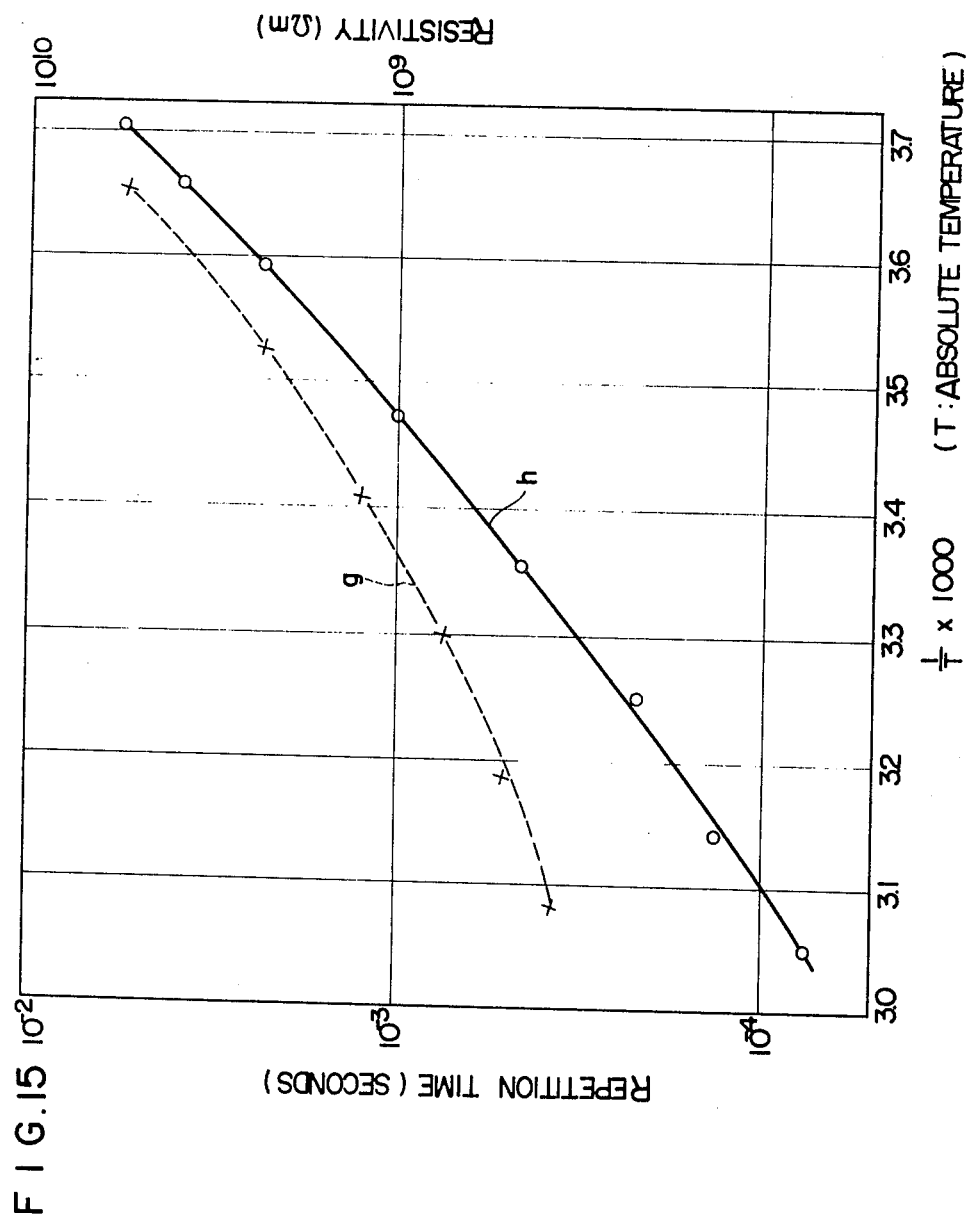
FIG. 15 is a graph showing the relation between repetition time of the operating voltage and temperature and the relation between resistivity of the liquid crystal and temperature.

A relation between the repetition time of the output of the circuit 149 and reciprocal of absolute temperature T as shown by dashed curve $g$ in FIG. 15, closely simulating the relation to curve $h$ between the resistivity and absolute temperature, was obtained by using a monostable multi-vibrator with the quasistable period $t_2$ set to about 10 microseconds as the multi-vibrator 76 and constructing the oscillator section 149 with the same elements as those of the specific construction of the oscillator section 63 mentioned earlier.

Here, the repetition time was measured by varying the temperature since the terminal resistance of the liquid crystal cell 150 depends upon the temperature. As is apparent from the plot, at a temperature of 0°C the resistivity was about $3.8 \times 10^9$ Ω.cm, while the corresponding repetition time was about $5.4 \times 10^{-3}$ second, corresponding to about 18.5 Hz. At a temperature of 50°C, the resistivity was about $9 \times 10^7$ Ω.cm, while the corresponding repetition time was about $3.7 \times 10^{-4}$ second, corresponding to about 2.7 kHz.

Figure 16:
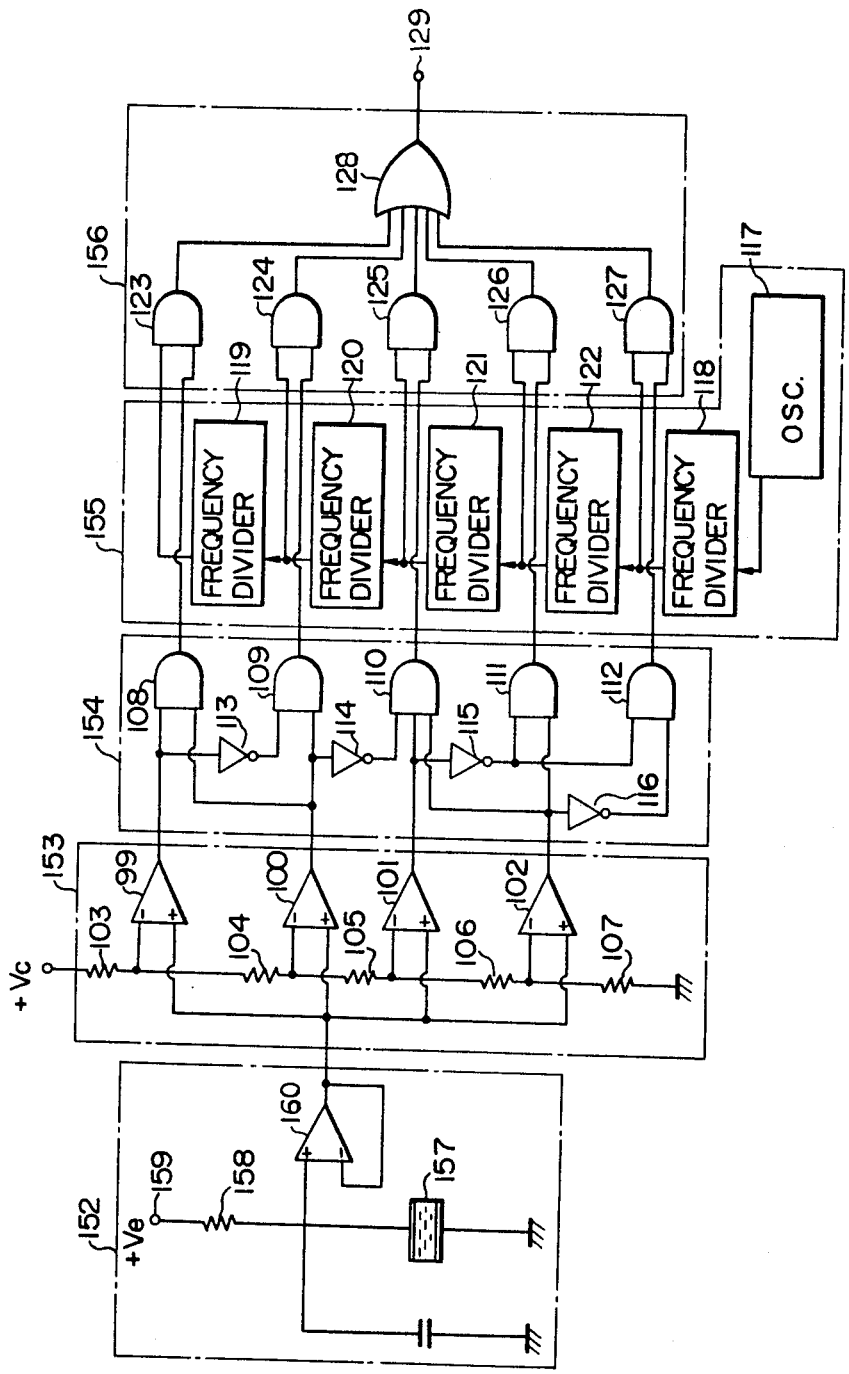
FIG. 16 is a schematic showing another example of the afore-mentioned part.

FIG. 16 shows another example of the variable frequency power source 146. In the Figure, numeral 152 designates a resistance section, numeral 153 a voltage comparator section, numeral 154 a frequency specifying section, numeral 155 an oscillator section, and numeral 156 a frequency selecting section.

The resistance detector section 152 comprises a liquid crystal cell 157 and a resistor 158, these elements constituting a voltage divider to divide a fixed voltage applied between a terminal 159 and ground between them. The voltage comparator section 153, frequency specifying section 154, oscillator section 155 and frequency selecting section 156 have the same construction as that in the case of FIG. 10, so that the component elements are designated by the same reference numerals here. This circuit is different from the circuit of FIG. 10 only in that in the resistance detector section 152 the liquid crystal 157 is substituted for the thermistor 96, and that the impedance converter 160 is inserted between the liquid crystal 157 and the next stage. In this case, a voltage at a frequency corresponding to the resistance of the liquid crystal 157 which depends upon the temperature appears at the output terminal 129.

Figure 17:
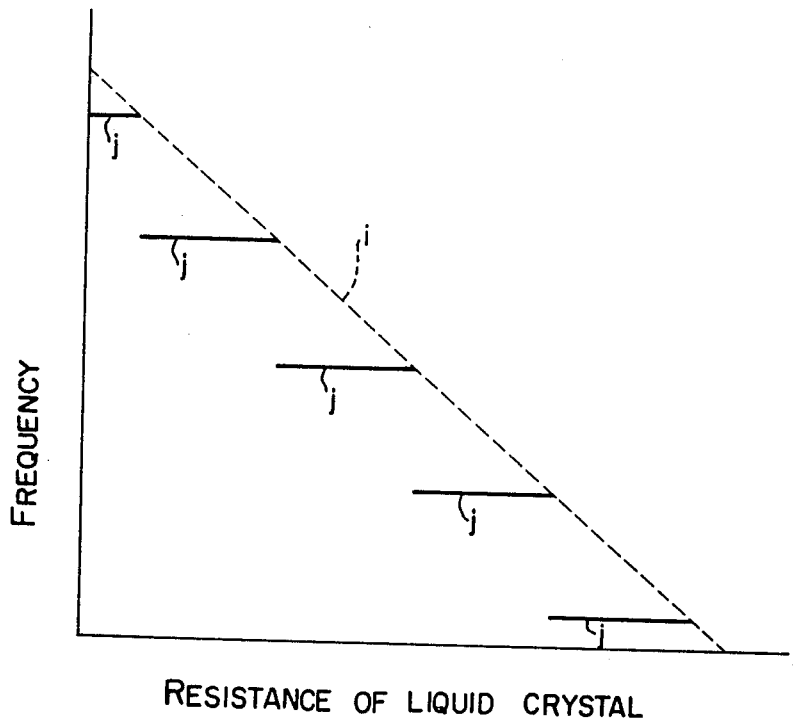
FIG. 17 is a graph showing a characteristic of the circuit of FIG. 16.

FIG. 17 shows the relation between output frequency and resistance of the liquid crystal. In the Figure, dashed line $i$ represents the relation between threshold frequency and resistance while solid lines $j$ represent the characteristic of the circuit of FIG. 16. Sufficient results can be obtained by varying the output frequency stepwise in this way at predetermined intervals of the resistance scale such that the output frequency will not greatly differ from the threshold frequency.

Figure 18:
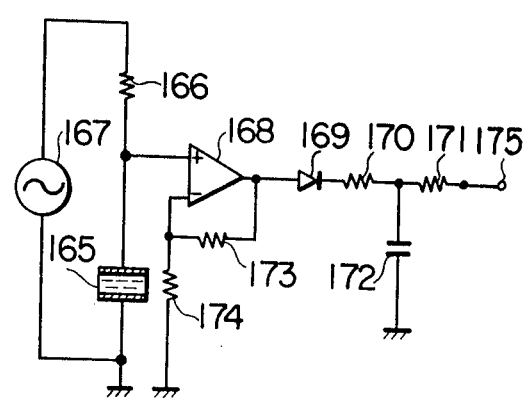
FIG. 18 is a schematic showing a further example of the afore-mentioned part.

FIG. 18 shows a further example of the resistance detector variable frequency section 147 and impedance converter section 148 in FIG. 14 or the resistance detector section 152 in FIG. 16.

The circuit comprises a liquid crystal cell 165 and a resistor 166 connected in series across an a-c power source 167. The terminal voltage across the liquid crystal cell 165 is amplified through an amplifier 168, whose output is converted into a d-c signal through a rectifying and shaping circuit comprising a diode 169, resistors 170 and 171 and a capacitor 172. Resistors 173 and 174 are connected to the amplifier 168, which functions as an impedance converter. In this case, the resistance of the liquid crystal cell 165 is measured by a a-c voltage, instead of a d-c voltage, to prolong the service life of the liquid crystal 165. The a-c voltage across the liquid crystal cell 165 is amplified and then rectified. The output d-c voltage at a terminal 175 controls the next stages 149 in FIG. 14 or 153 in FIG. 16.

FIGS. 19 and 20 show an example of the electrode arrangement of the liquid crystal display board 32. Numeral 182 designates one of paired glass plates, which is provided on one side with a common electrode 334 and one resistance detection electrode 344. Numeral 183 designates the other glass plate, which is provided on the side facing the glass plate 182 with electrodes 335 to 338 facing the common electrode 334 and the other resistance detection electrode 345 facing the electrode 344. The electrodes 335 to 338 constitute segments of numeral figures or the like to be displayed. They are selectively energized through their respective terminals 184 to cause dynamic scattering in the liquid crystal layer between them and the common electrode 334. An auxiliary electrode 185 is provided between the electrodes 334 and 344, and another auxiliary electrode 186 is provided between the group of electrodes 335 to 338 and the electrode 345.

The auxiliary electrodes 185 and 186 are provided for preventing the region of the resistance detection electrodes 344 and 345 from being affected by voltage applied between electrodes 335 and 338 and the common electrode 334 for display. Thus, the electrodes 344 and 345 are practically isolated from the region of the display electrodes, so that precise detection of the resistance of the liquid crystal can be ensured.

A further embodiment of the invention to be described hereinafter in detail deals with the aspect that the rise time $\tau$ required for driving the liquid cyrstal from the transparent state into non-transparent state or so-called dynamic scattering state tends to greatly vary with temperature. More particularly, its primary end is to provide compensation with respect to the aforementioned tendency by changing the operating voltage applied with temperature such that the aforementioned rise time is fixed in the neighborhood of a predetermined value conforming to the practical character of the display system, thereby reducing power consumption and extending the service life of the liquid crystal.

In order for that embodiment to be best understood, the related technical background will first be discussed. For driving the liquid crystal display means of the afore-mentioned kind from the transparent state into the dynamic scattering state it has been usual to apply a d-c or a-c voltage of a constant level to the means irrespective of the temperature in the neighborhood of that means. In such constant voltage mode of operation, however, the rise time after the application of the operating voltage till the reaching of a certain dynamic scattering state greatly varies with temperature as will be discussed hereinafter in detail. Therefore, if the operating voltage is set such as to obtain a rise time required in practice at low operating temperatures of the display system, the rise time is excessively reduced at high temperatures. Besides, since the resistance of the liquid crystal used in the system is also reduced, the power consumption of the system is unnecessarily increased. On the other hand, if the operating voltage is set such as to obtain a practically sufficient rise time at high temperatures, the rise time is low temperatures tends to be too long for practical use.

The basic concept underlying this aspect of the invention and experimental means for examining the pertaining voltage response characteristics of the liquid crystal will now be described.

FIG. 21 outlines a set-up for investigating light scattering characteristics of liquid crystals. There is shown a liquid crystal cell 187. Light projected from a light source 188 and rendered into a substantially parallel light beam through a front aperture plate 189 having a small hole or aperture enters the cell at right angles thereto. Light penetrating a small hole or aperture of a rear aperture plate 190 enters a light receiver 199, which produces a voltage in proportion to the amount of incident light.

Numeral 192 designates a square wave generator, whose output voltage and frequency are variable. Numeral 194 designates a switch, through which the square wave voltage output is coupled between the electrodes 195 and 196 of the liquid crystal cell 187. Numeral 197 designates a display device. The output of the light receiver 199 goes to one input of the device 197, and the voltage that is impressed across the liquid crystal cell 187 through the switch 194 is also led to another input terminal of the device 197. Further, the voltage with which is to drive the switch is also transmitted from the timer 193 to the device 197. Numeral 198 designates a temperature controller which is used to maintain the sample liquid crystal cell 187 at a constant temperature. The electrodes 195 and 196 of the sample cell 187 used in this optical system are both transparent, and a straight light path from the light source 188 of the light receiver 199 is provided.

With this system, the amount of light received by the light receiver 199 is maximum when the liquid crystal cell 187 is transparent. When the cell 187 is brought into the scattering state, the amount of light penetrating the aperture of the aperture plate 190 is reduced to reduce the output of the light receiver 199.

FIG. 22 shown the behavior of the liquid crystal to change from its transparent state to its scattering state and then back to its initial state in accordance with the closure and opening of the switch 194. The light response is indicated at $k$, the maximum amount of light incident on the light receiver 199 at A, and the level when the incident light is totally shut off at 0 in the Figure. Indicated at $l$ is the waveform of the applied alternating voltage, with which the amount of received light reduced in the way represented by the light response characteristic curve $k$, eventually settling to a stable scattering state level B. The rise time when the scattering is brought about is defined as the time required until the level of incident light is reduced to point C corresponding to a reduction by 90 percent of the maximum amplitude $\overline{AB}$. After the removal of the applied voltage the transparent state of the liquid crystal is recovered. The time required until point D corresponding to 90 percent of the maximum level $\overline{OA}$ is reached after the removal of the applied voltage is defined as erase time ($\tau \alpha$).

The sample whose light response characteristics are exemplified hereinafter was prepared by mixing equal quantities of materials represented as

and

incorporating 20 percent of a material represented as

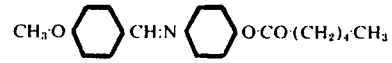

to the mixture and then adding 1 percent of lauryl gallate to the resultant ternary liquid crystal mixture. The sample cell had a liquid crystal layer thickness of 5.6 micrometers.

The temperature range for the liquid crystal of the above composition was estimated to be at least between $-20°C$ and $+58°C$.

FIG. 23 shows the characteristic dependency of the rise time of the afore-mentioned sample upon the applied voltage and frequency thereof at a temperature of 30°C. The Figure shows two plots for the applied voltage of 8 Vrms and 15 Vrms respectively. FIG. 24 shows the dependency of the rise time upon the operating frequency and temperature with an applied voltage of 15 Vrms. As is apparent from FIGS. 23 and 24, it is possible to define a rise time ($\tau$ r.T.V.), which is prescribed by temperature and operating voltage but not by operating frequency and another rise time ($\tau$r.T.V.f.), which is further prescribed by the operating frequency. Further, frequencies corresponding to rise times 50 percent longer than the aforementioned rise time ($\tau$r.T.V.) are defined as the threshold frequency $f_{th}$ and indicated by arrow marks in FIGS. 23 and 24.

Where the liquid crystal cell is used as a display means it is very important that the light scattering ratio between the dynamic scattering state and transparent state be large. This light scattering ratio depends upon the temperature, operating voltage and operating frequency. In case of changing only the operating frequency, with an operating frequency below the aforementioned threshold frequency $f_{th}$ the rise time is short and the light scattering ratio is large and is substantially constant. On the other hand, when the operating frequency is increased beyond the threshold frequency $f_{th}$ the light scattering ratio is usually reduced with increasing rise time, the scattering being ultimately lost. Accordingly, the afore-mentioned rise time ($\tau$r.T.V.) is used in practice, and the operating frequency is limited to be below a frequency in the neighborhood of the aforementioned threshold frequency $f_{th}$.

Meanwhile, it has been experimentally proved that the erase time does not depend upon the operating voltage and frequency but is determined by the temperature.

FIG. 25 shows the temperature dependency of the rise time ($\tau$r.T.V.) and erase time with the applied voltage used as the third parameter, and FIG. 26 shows the dependency of the rise time ($\tau$r.T.V.) upon the applied voltage with the temperature used as the third parameter.

It will be seen from these Figures that there are derived rough empirical relations $$\tau r.T.V. \sim V^{-n} \exp(-E/KT)$$

and $$\tau \sim \exp(-E/KT)$$

where V is the effective operating voltage, E is a constant in the same unit as of energy, K is Boltzmann's constant, T is absolute temperature and $n$ is a constant substantially equal to 3 within the range of the experiments.

In case of using the liquid crystal cell having the rise time ($\tau r.T.V.$) characteristic as shown in FIG. 25 as a display means over a temperature range from 0°C to 40°C, the rise time ($\tau r.T.V.$) will vary up to substantially 10 times with temperature. The response speed of the human eye is about 100 milliseconds. In order to satisfy this response speed over the entire temperature range mentioned above the cell should be operated with 15 volts. At the highest operating temperature of 40°C the rise time with 15 volts is 15 milliseconds. In practice, the rise time need not be so short as this value, but 90 milliseconds with an operating voltage of 8 volts is sufficient. In case of a constant operating voltage of 8 volts, there is felt no problem in the rise time at an operating temperature of 20°C or above, but at 0°C the rise time is too long, which is a fatal problem in practice.

Meanwhile, the resistivity of the liquid crystal varies as a function of temperature roughly given as $$\rho \sim \exp(E_2/KT)$$

FIG. 27 shows the relationship among rise time ($\tau r.T.V.$), consumed power and resistivity, and hence temperature, of the aofre-mentioned sample. In the Figure, rightwardly rising plots represent the rise time ($\tau r.T.V.$), with the figures at the right hand end of these plots indicating the operating voltage. The lower gradations along the abscissa axis indicate the resistance of the liquid crystal cell under the assumption that the ratio d/s between the thickness $d$ and area S of the sample is equal to $10^{-3}$ cm$^{-1}$, that is, the area of the sample is 0.56 cm$^2$. The rightwardly falling dashed plots $m$ and $n$ represent the consumed power with operating voltage of 15 volts and 8 volts respectively. The rightwardly rising plot $o$ results in case of reducing the operating voltage from 15 volts to 8 volts with temperature increase from 0°C to 30°C and fixing it to 8 volts for temperatures from 30°C to 40°C. By varying the operating voltage according to temperature as in this example, it is found to be possible to fix the rise time in the neighborhood of 100 milliseconds over a wide temperature range from 0°C to 40°C, as will be recognized from the Figure.

The rightwardly falling plot $p$ represents the consumed power versus temperature characteristic in the case of controlling the operating voltage as in the aforementioned example. Comparing the plots $p$ and $m$, the ratio of the comsumed power between these cases at a temperature above 30°C is $8^2/15^2 = 0.28$. Thus, the consumed power with 8 volts is greatly reduced compared to the case of 15 volts. The reduction of the power consumption to the above extent is thus possible for a high temperature range where the resistance of the liquid crystal is low, that is, where a predominating proportion of power is consumed. This means that if the above measure is applied to a system using a small battery as drive source, for instance wrist watches and electronic table computers, the life of the battery can be outstandingly extended. In a wrist watch, for example, by using a complementary integrated circuit it is possible to achieve a design power consumption of several microwatts for all circuitry including the oscillator section, counter section, drive section and so forth, whereas with a constant operating voltage of 15 volts the power consumption of a liquid crystal display section with the afore-mentioned order of area and resistance reaches as high as 500 microwatts at 30°C.

Meanwhile, it is common knowledge among specialists that the life of the liquid crystal used in a display system is shorter the higher the operating voltage and the lower the resistance (of the liquid crystal). Thus, the life of the liquid crystal can be extended by reducing the operating voltage particularly when the resistance of the liquid crystal is low as according to this invention.

Also, it is possible to change the operating voltage such as to fix the sum of rise time and erase time $\tau\alpha$, which also changes with temperature, to the neighborhood of a predetermined time interval.

FIG. 28 shows an embodiment of the liquid crystal display system, which incorporates the principles discussed above underlying the invention, and in which the power source voltage is controlled according to a temperature detection signal. In the Figure, numeral 199 designates a logical circuit section, numeral 200 an operation instructing section, for instance a decoder, controlling a liquid crystal drive circuit 201. These sections are furnished with power from a constant voltage source 202. Numeral 203 designates a variable voltage source section including a temperature detector 204 and a variable voltage source 205 controlled by the signal from the temperature detector. The variable voltage source section 203 may be absolutely independent from the constant voltage source 202, or the variable voltage source 205 may receive the output of the constant voltage source 202 and function as a variable voltage converter. Further, if the logical circuit section 199 and operation instructing section 200 can operate with voltage directly supplied from the variable voltage source 205, the constant voltage source 202 may be omitted. Numeral 206 designates a liquid crystal display board which constitute together with its drive circuit 201 a liquid crystal display section 207. The drive circuit 201 is furnished with power from the variable voltage source 205, so that the operating voltage applied to the liquid crystal display board 206 naturally depends upon the output voltage of the source 205.

FIG. 29 shows a specific example of the variable voltage source section 203 shown in FIG. 28. Its whole construction is well known as a stabilized power source circuit. The output voltage from an output voltage detector 208 is compared with a voltage of a reference voltage section 209 in a comparator 210, whose difference signal output is amplified by an amplifier 211, whose output in turn goes to a controller 212 to vary the conductance thereof for controlling the output voltage through negative feedback to a d-c power source 213.

FIG. 30 shows an example of the output voltage section 208. With this construction, the output voltage of the circuit of FIG. 29 decreases with increasing temperature. Numeral 214 designates an element offering a resistance reducing with increasing temperature, for instance a negative characteristic thermistor, numeral 215 an element offering a resistance increasing with increasing temperature, for instance a positive characteristic thermistor, and numerals 216 and 217 voltage dividing resistors for setting the detection voltage. Of course, one of the thermistors 214 and 215 may be omitted if possible in the design of the circuit.

Liquid crystal display systems of revolutionary improved usefulness as mentioned earlier may be obtained by so arranging as to couple the output power from the variable voltage source of the above construction to various known liquid crystal drive means to be described hereinafter.

Figure 31A:
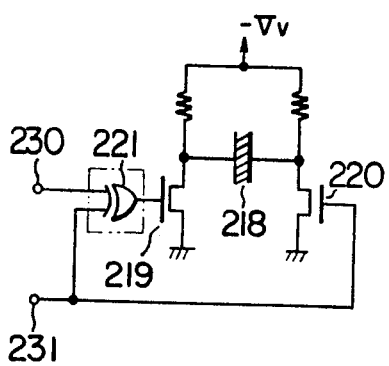
Figure 31B:
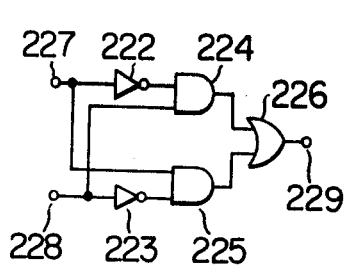

FIG. 31a shows an example of the liquid crystal drive circuit of a well-known construction but simplified by using P-channel enhancement MOS transistors. In the Figure, numeral 218 designates a liquid crystal display board, which is driven by the difference between the drain voltages of two transistors 219 and 220. Numeral 221 designates an exclusive OR circuit. FIG. 31b shows an example of this circuit. It comprises inverters 222 and 223, AND gates 224 and 225 and an OR gate 226. A square wave input as shown at $q$ in FIG. 31c appears at one input terminal 227 of the circuit of FIG. 31b. If the potential at the other input terminal 228 is 0, a signal of the same phase as the input to the terminal 227 appears at an output terminal 229. If the potential at the input terminal 228 is 1, a signal of the opposite phase to the input to the terminal 227 appears at the output terminal 229.

Figure 31C:
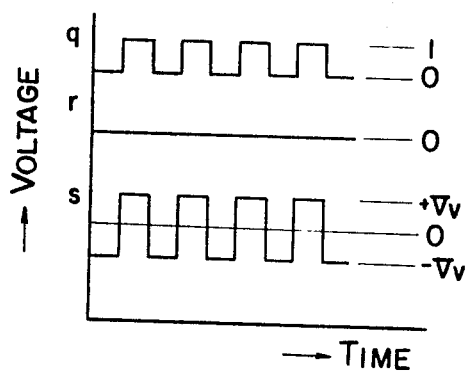
Figure 31D:
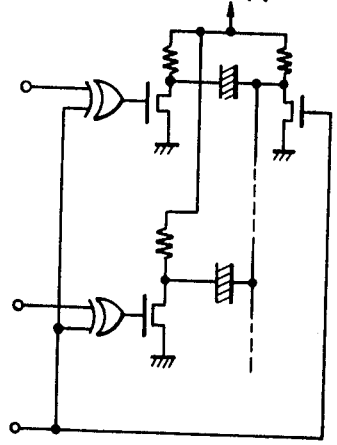

Thus, if the potential at the input terminal 230 in FIG. 31a is 1, the transistors 219 and 220 are alternately on-off switched according to the square wave voltage (shown at $q$ in FIG. 31c) at the input terminal 231, so that an alternating voltage as shown at $s$ in FIG. 31c is applied across the liquid crystal display board 218, thus driving the liquid crystal display board 218 into the dynamic scattering state. If the input to the input terminal 230 is 0, the transistors 219 and 220 are simultaneously on-off switched according to the potential on the input terminal 231, so that the voltage applied across the liquid crystal display board 218 is zero as shown at $r$ in FIG. 31c. FIG. 31d shows a circuit for driving a liquid crystal display board having a plurality of elementary liquid crystal cells. It is actually a simplified form of a combination of a plurality of the circuits of FIG. 31a. The circuits of FIGS. 31a and 31d are furnished with power from the negative polarity output of the afore-mentioned variable-frequency voltage source.

Figure 31E:
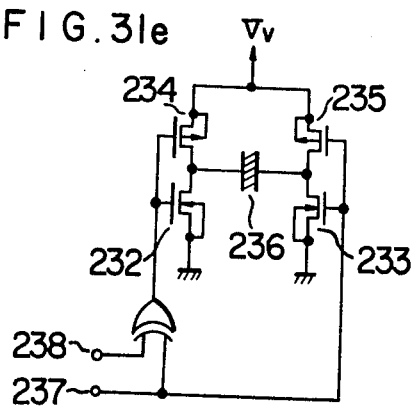

FIG. 31e is a modification of the circuit of FIG. 31a, and it is constructed by using complementary MOS transistors. In the Figure, numerals 232 and 233 designate N-channel MOS transistors, and numerals 234 and 235 P-channel MOS transistors. Voltage is applied across liquid crystal display board 236 through the drains of all the transistors. A square wave voltage as shown at $q$ in FIG. 31c is added to input terminal 237. When this potential is 1, the transistor 233 is "on", while the transistor 235 is "off" so that the potential on the common drain of the transistors 233 and 235 is 0. When the input potential on the input terminal 237 is 0, the transistor 235 is "on", while the transistor 233 is "off", so that the potential on the common drain is 1, i.e., equal to the source voltage $V_r$. The other paired transistors 232 and 234 operate similarly according to their gate potential. Thus, the voltage applied across the liquid crystal display board 236 changes as shown in FIG. 31c according to the potential on input terminal 238. The circuit of FIG. 31e is furnished with power from the positive polarity output of the afore-mentioned variable frequency power source.

FIGS. 32a and 32b show examples of the liquid crystal drive circuit in case where the variable frequency power source 205 in FIG. 28 directly supplies a-c power to the circuit 210 through a low frequency inverter or through voltage conversion from, for instance, a commercial power source. In the Figures, numeral 239 designates a three-terminal bilateral thyristor, and numeral 240 a gate electrode thereof. This thyristor 239 is rendered into its conduction state or turned on when a voltage above its threshold voltage is impressed upon the gate electrode 240, while it is rendered into its non-conductive state or turned off when the gate voltage is substantially reduced to zero. Thus, in the example of FIG. 32a when the input voltage to the gate electrode 240 is reduced to zero the liquid crystal display board 241 is driven into the dynamic scattering state. On the other hand, when the above input voltage exceeds the threshold voltage substantial part of the voltage $V_{AC}$ of the variable frequency power source appears across resistor 242, so that a sufficient voltage to maintain the scattering will no longer be applied across the liquid crystal display board 241. As a result, the liquid crystal display board 241 becomes transparent.

In the example of FIG. 32b, the relation of the input voltage to the gate electrode 240 to the scattering or transparent state of the liquid crystal display board 241 is opposite to that in the example of FIG. 32a.

FIGS. 33a, 33b and 33c show examples in case where the liquid crystal is driven in a d-c mode. In the Figures, numeral 243 designates the same transistor as those shown in FIG. 31a. In the example of FIG. 33a, the supply voltage $-V_r$ from a negative variable voltage power source is applied through resistor 244 to liquid crystal display board 245 if the transistor 243 is "off", while it is not if the transistor 243 is "on". In the examples of FIGS. 33b and 33c, the operation is opposite to the above.

FIGS. 34a, 34b and 34c show examples where the supply voltage to the liquid crystal drive circuit 201 in FIG. 28 is held constant so that the voltage applied across the liquid crystal is changed in effect with temperature.

The FIG. 34a example is similar to the previous FIG. 31a example except that it incorporates elements whose resistances change with temperature as the load for transistors. Numeral 246 designates elements of decreasing resistance with increasing temperature, for instance a negative characteristic thermistor, and numeral 247 elements of increasing resistance with increasing temperature, for instance a positive characteristic thermistor. With this construction, the voltage amplitude at point A is given as $R_{247} \cdot V/(R_{247} + R_{246})$, where $R_{246}$ and $R_{247}$ the resistances of the thermistors 246 and 247. Where these resistances change in the afore-mentioned way, the effective voltage applied across liquid crystal display board 249 may be changed according to the temperature. Depending upon design requirements, either thermistors 246 or 247 may be replaced with usual fixed resistance. The FIGS. 34b and 34c examples use an element of the same character as the positive characteristic thermistors in the preceding FIG. 34a example.

FIG. 35 shows examples of the variable voltage source producing variable voltage according to temperature. In the example of FIG. 35a, elements 250 and 251 exhibit similar changes of resistance with temperature to those of the afore-mentioned thermistors 246 and 247. They constitute a voltage divider to supply as output the division of the input voltage supplied from a d-c power source 242. FIGS. 35b, 35c and 35d show examples of the method of obtaining d-c voltage from a-c voltage or obtaining a variable output voltage in case of using a d-c converter. In the FIG. 35b example, the voltage of an a-c voltage source 253 is converted through a transformer 254 having a plurality of output terminals to take out a suitable voltage according to temperature through a switch 255 for conversion into d-c through a diode 256 and a capacitor 257. The FIG. 35c example uses a switching element 258 on-off operated according to temperature such as a bimetal. The FIG. 35d example uses a plurality of elements similar to switching element 258 in the FIG. 35c example but actuated at different temperatures. In the examples of FIGS. 35b, 35c and 35d, the output voltage varies not continuously but step-wise according to temperature. The FIG. 35e example is used where the liquid crystal is driven by using an a-c control element such as those shown in FIG. 32.

What we claim is:

1. A liquid crystal display system comprising:
   a liquid crystal display device including a nematic liquid crystal;
   a display signal source for selectively generating at least one display signal, said display signal indicating a portion of said display device to be driven to the dynamic scattering state;
   temperature responsive means responsive to the temperature of said display device, said temperature responsive means generating a correction signal which varies with changes in the temperature of said display device;
   a variable frequency power source providing an output signal having a frequency responsive to said correction signal whereby said frequency increases with increases in the temperature of said display device; and
   means for gating responsive to said at least one display signal for applying said output signal to said device portion whereby said output signal drives said portion to said dynamic scattering state.

2. A liquid crystal display system as claimed in claim 1, wherein the frequency of said variable power source is increased continuously with increases in the temperature of said display device.

3. A liquid crystal display system as claimed in claim 1, wherein the frequency of said variable power source is increased in a step-wise manner with increases in the temperature of said display device.

4. A liquid crystal display system as claimed in claim 1, wherein said variable power source comprises an oscillator, said oscillator including a first capacitor for receiving thereacross the correction signal generated by said temperature responsive means; a second capacitor; controllable conductance means controlled by the voltage across said first capacitor, said second capacitor being charged through said controllable conductance means in accordance with the voltage across said first capacitor; comparator means for comparing the voltages across said first and second capacitors, the output of said comparator changing states when the voltage across said second capacitor increases to a predetermined value with respect to the voltage across said first capacitor; switching means for discharging said second capacitor; bistable means having a first input and a first output coupled to the output of said comparator means and said switching means respectively for controlling said switching means to discharge said second capacitor when the output of said comparator changes states; monostable means connected between the output of said comparator and a second input of said bistable means for changing the state at the first output of said bistable means to control said switching means after said second capacitor has been discharged to permit said second capacitor to be recharged through said controllable conductance means, said output signal having a frequency which increases with increases in the temperature of said display device being generated at a second output of said bistable means.

5. A liquid crystal display system as claimed in claim 1, wherein said temperature detecting means includes thermistor means for producing a temperature responsive correction voltage; and said variable power source comprises comparator means having an input coupled to said thermistor means for comparing said temperature responsive correction voltage with a plurality of reference voltages preset to values corresponding to temperatures within the range of temperature to which said liquid crystal is subjected, said comparator having an output corresponding to said temperature responsive correction voltage; oscillator and frequency divider means for generating a plurality of discrete frequencies, each one of said discrete frequencies corresponding to one of said plurality of reference voltages; and frequency selection means coupled to said comparator means and said frequency divider means for selecting one of said plurality of frequencies in response to the output of said comparator means.

6. A liquid crystal display system as claimed in claim 1, wherein said temperature detecting means includes bimetal means for producing a temperature responsive correction voltage; and said variable power source comprises means for generating a voltage having a first frequency, means for generating a voltage having a second frequency different from said first frequency, and frequency selection means controlled by said temperature detecting means for selecting either the voltage having said first or second frequency to be said output signal depending upon the magnitude of said temperature responsive correction voltage.

7. A liquid crystal display system as claimed in claim 1, wherein said liquid crystal has a temperature variable threshold frequency whereby a drive signal having a frequency above said threshold frequency applied to said liquid crystal leaves said liquid crystal in the transparent state, and said variable power source comprises means for setting the variable frequency of said output signal close to said threshold frequency in response to said temperature responsive means.

8. A liquid crystal display system comprising:
   a liquid crystal display device including a nematic liquid crystal;
   a display signal source for selectively generating at least one display signal, said display signal indicating a portion of said display device to be driven to the dynamic scattering state;

resistance detecting means for detecting the resistance of said liquid crystal, said resistance detecting means generating a correction signal which varies with changes in the resistance of said liquid crystal;

a variable frequency power source providing an output signal having a frequency responsive to said correction signal whereby said frequency decreases with increases in the resistance of said liquid crystal; and means for gating responsive to said at least one display signal for applying said output signal to said device portion whereby said output signal drives said portion to said dynamic scattering state.

9. A liquid crystal display system as claimed in claim 8, wherein the frequency of said variable power source is decreased continuously with increases in the resistance of said liquid crystal.

10. A liquid crystal display system as claimed in claim 8, wherein the frequency of said variable power source is decreased step-wise with increases in the resistance of said liquid crystal.

11. A liquid crystal display system as claimed in claim 8, wherein said resistance detecting means comprises at least one pair of electrodes provided in said display device and holding therebetween part of said liquid crystal for detecting the resistance thereof.

12. A liquid crystal display system as claimed in claim 8, wherein said liquid crystal has a temperature variable resistivity, and said variable power source controls the variable frequency of said output signal so as to vary the reciprocal of said output signal frequency in proportion to said resistivity.

13. A liquid crystal display system comprising:
a liquid crystal display device including a nematic liquid crystal;
a display signal source for selectively generating at least one display signal, said display signal indicating a portion of said display device to be driven to the dynamic scattering state;

temperature responsive means responsive to the temperature of said display device, said temperature responsive means generating a correction signal which varies with changes in the temperature of said display device;

a variable power source providing an output signal having a voltage responsive to said correction signal whereby the magnitude of said correction signal increases with decreases in the temperature of said display device; and means for gating responsive to said at least one display signal for applying said output signal to said device portion whereby said output signal drives said portion to said dynamic scattering state.

14. A liquid crystal display system as claimed in claim 13, wherein said variable power source comprises a variable voltage source for generating said correction signal, the magnitude of said correction signal decreasing continuously with increases in the temperature of said display device.

15. A liquid crystal display system as claimed in claim 13, wherein said variable power source comprises a variable voltage source for generating said correction signal, the magnitude of said correction signal decreasing in a step-wise manner with increases in the temperature of said display device.

16. A liquid crystal display system as claimed in claim 13, wherein a dynamic scattering effect is produced within said liquid crystal having a rise time dependent upon the temperature of said liquid crystal and upon the voltage of said drive signal, and said variable voltage power source controls the magnitude of said correction signal to secure a rise time which remains within a fixed range despite changes in the temperature of said liquid crystal.

* * * * *